F. WILCOMB.
CIRCULAR KNITTING MACHINE.
APPLICATION FILED OCT. 2, 1912.

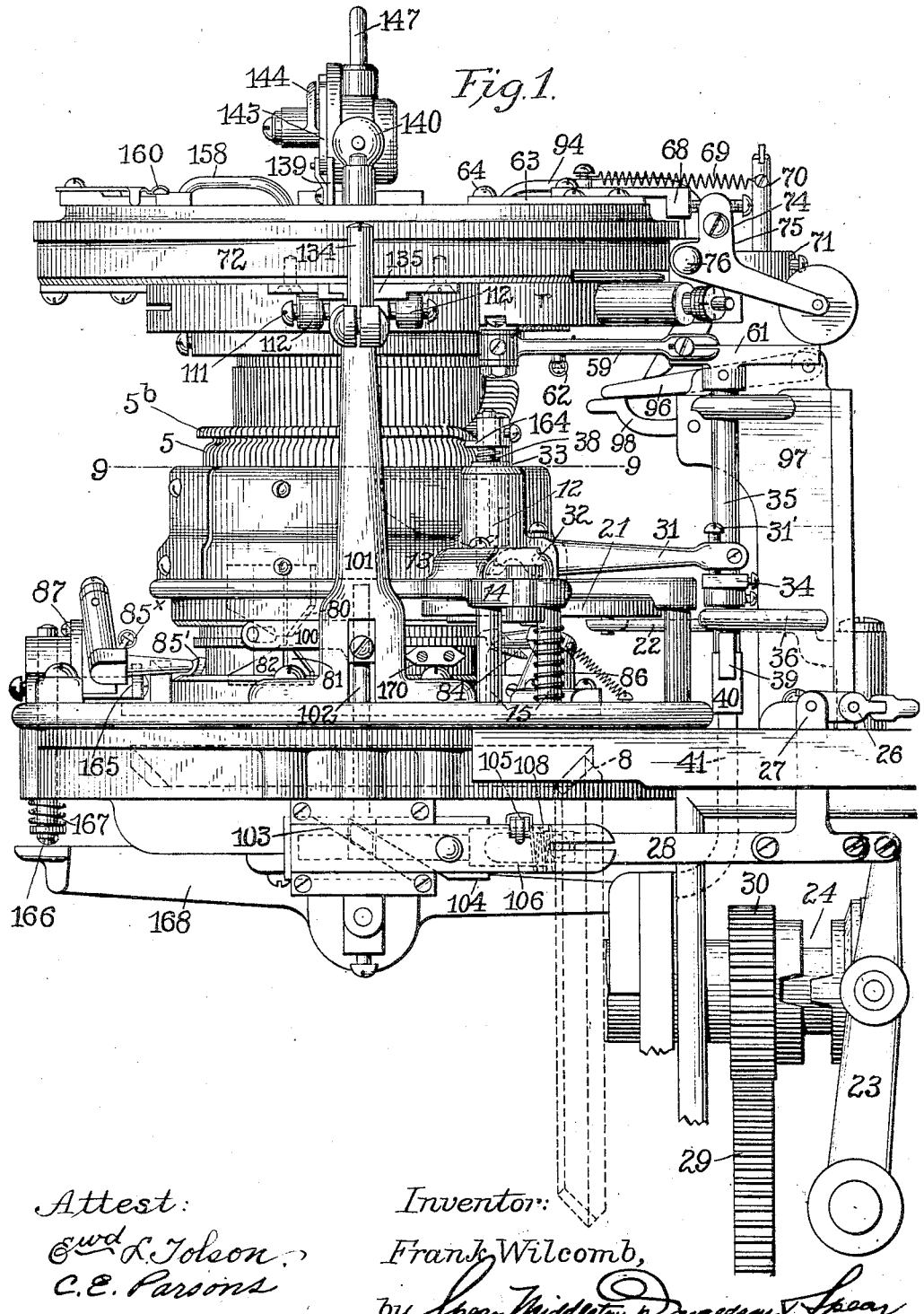

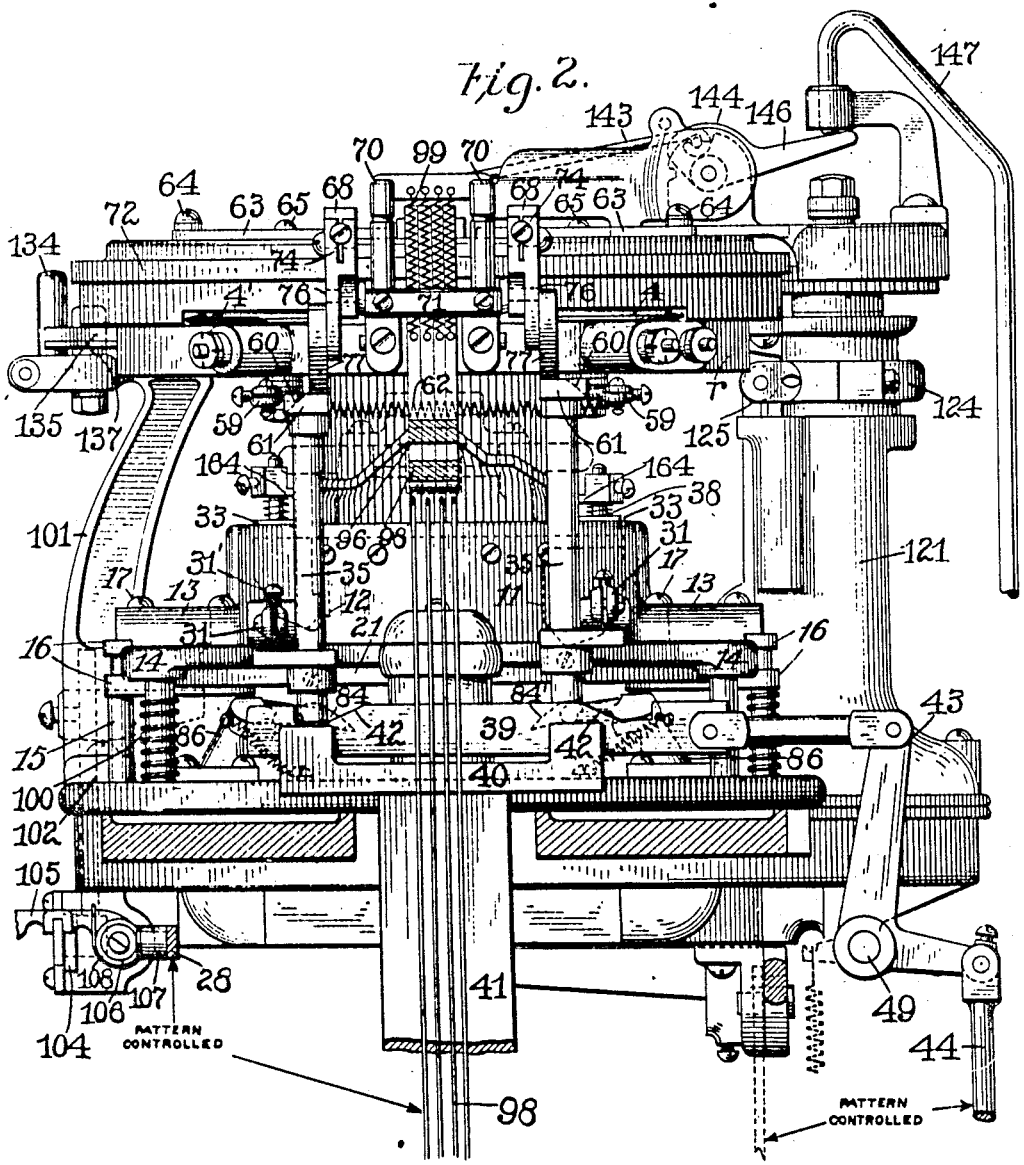

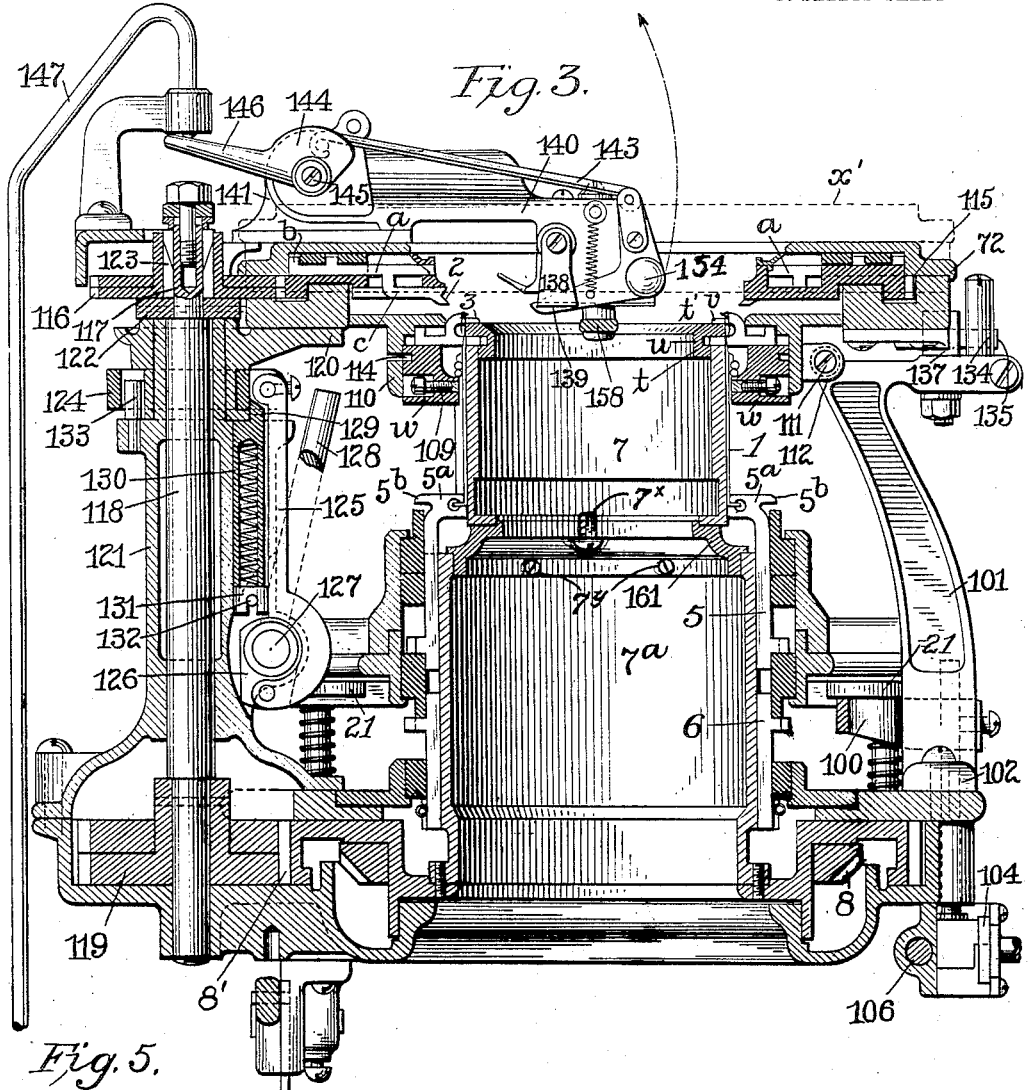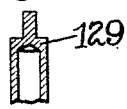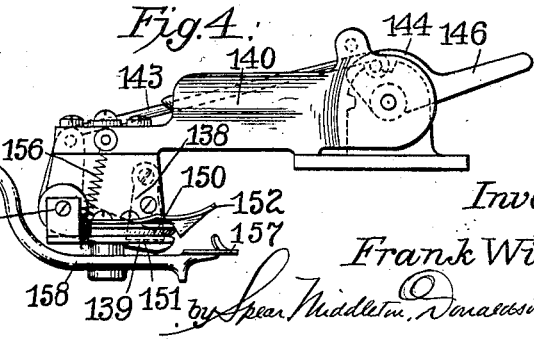

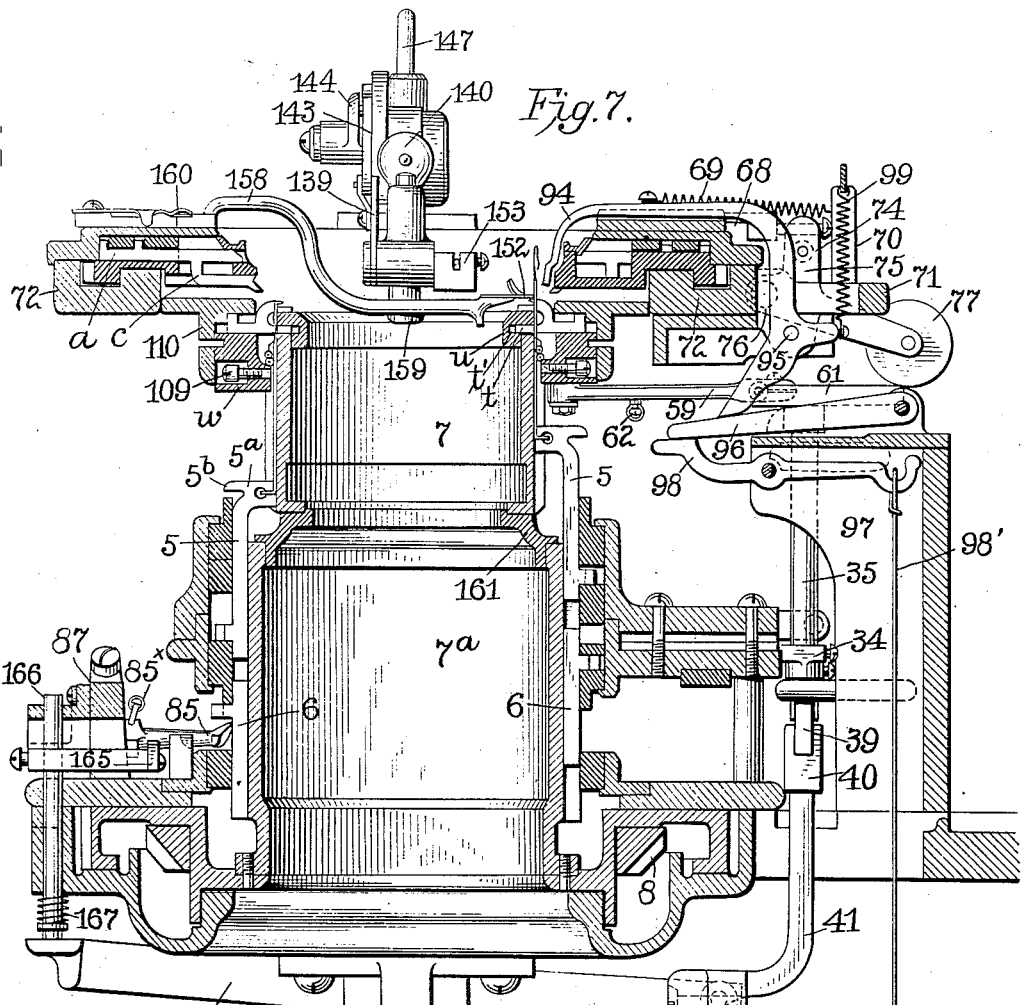
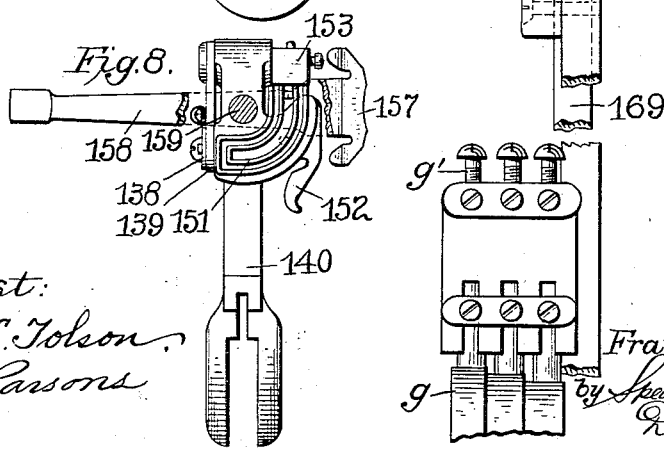

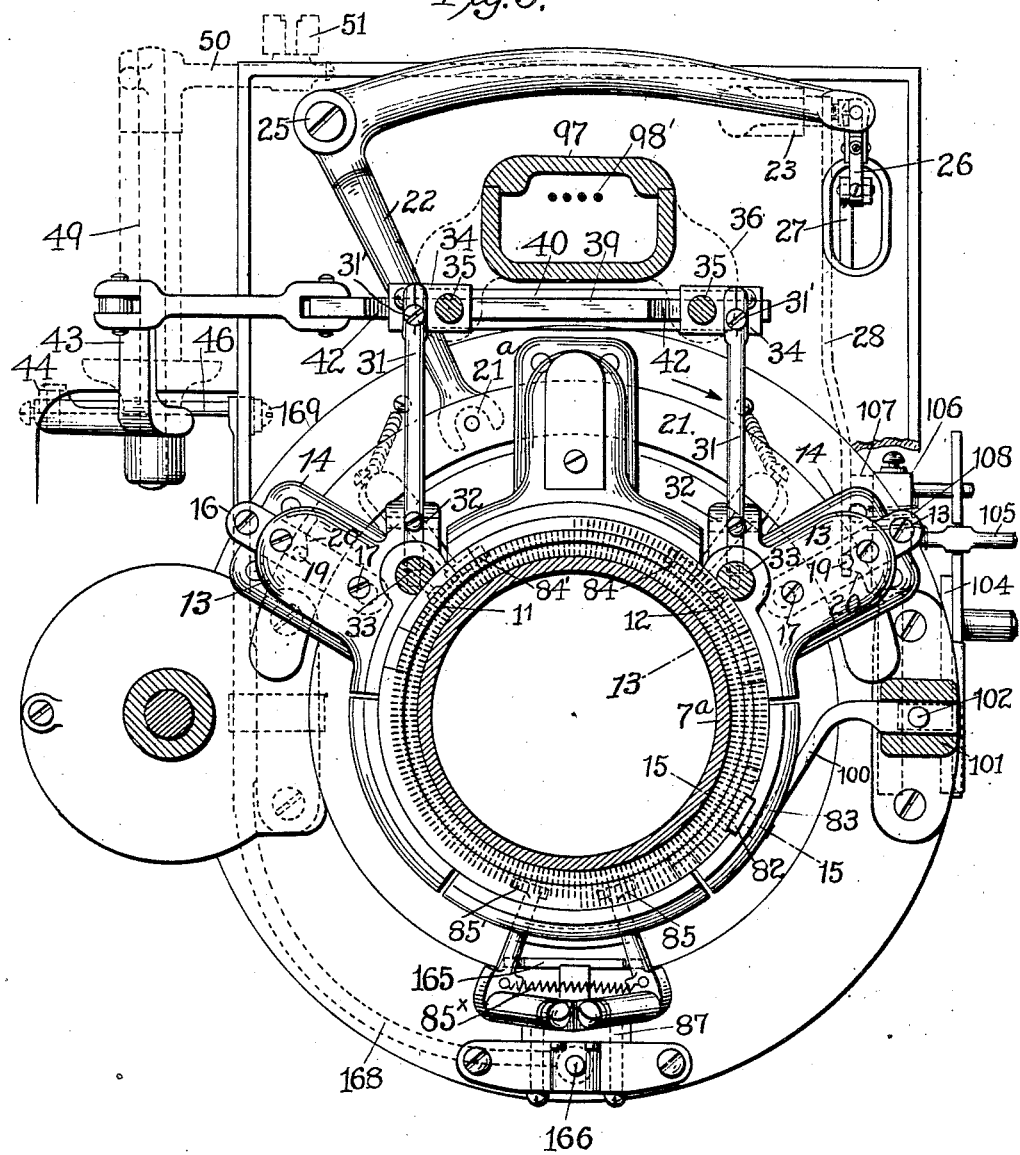

1,131,583.

Patented Mar. 9, 1915.
10 SHEETS—SHEET 6.

Attest:
Ewd L. Tolson
C. E. Parsons

Inventor:
Frank Wilcomb,
by Spear, Middleton, Donaldson & Spear
Attys.

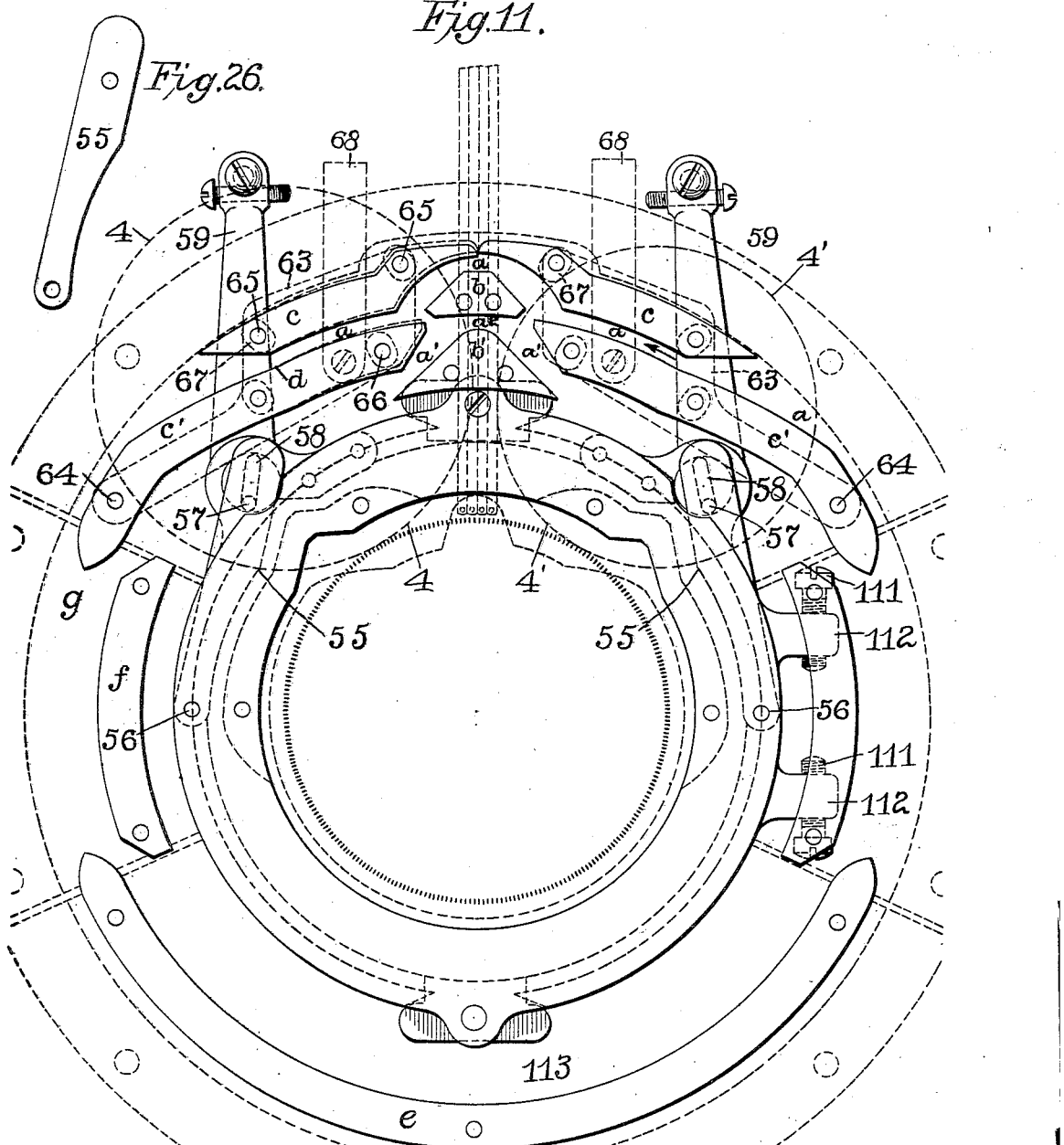

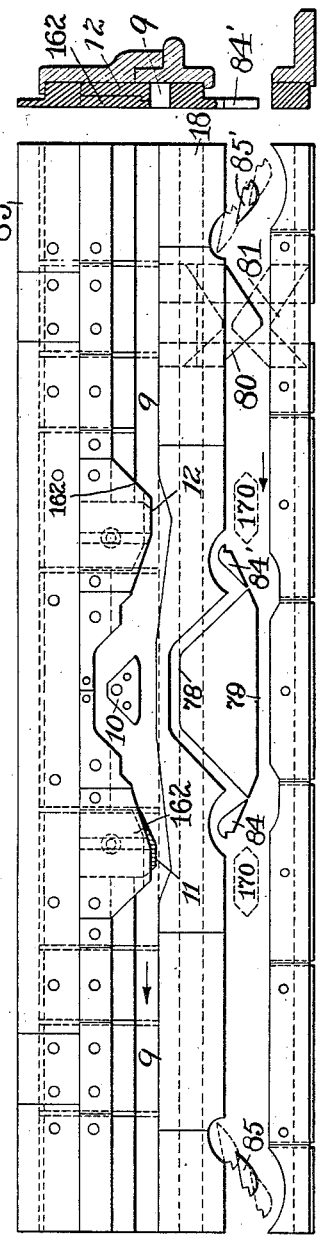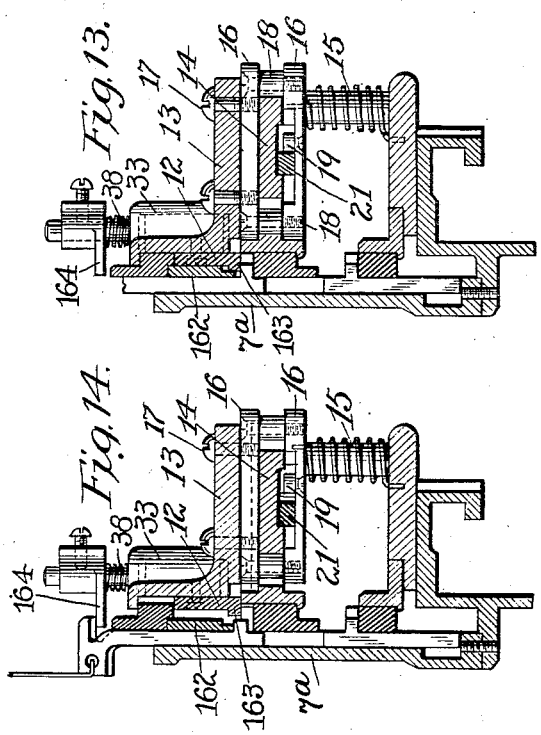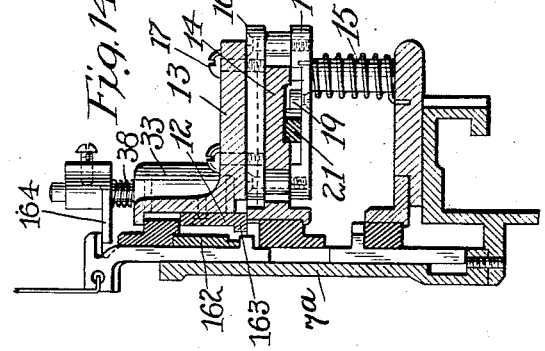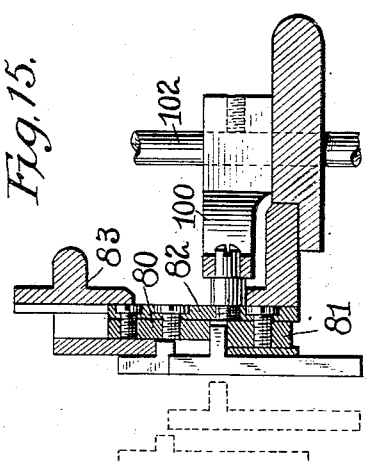

F. WILCOMB.
CIRCULAR KNITTING MACHINE.
APPLICATION FILED OCT. 2, 1912.
1,131,583.
Patented Mar. 9, 1915.
10 SHEETS—SHEET 9.
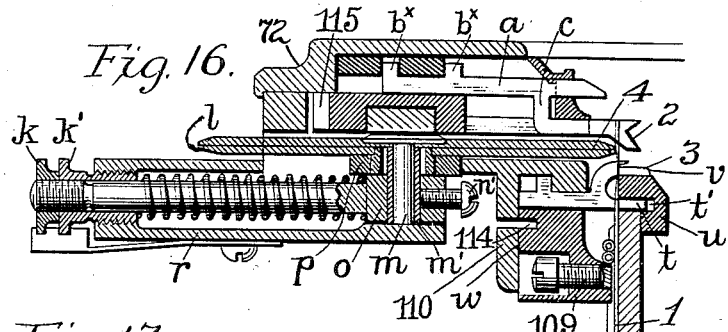
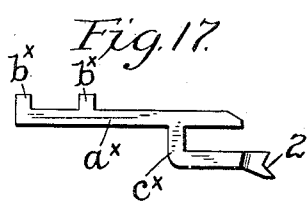
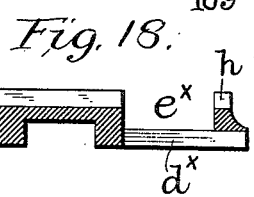
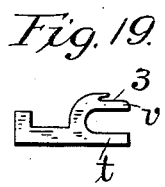
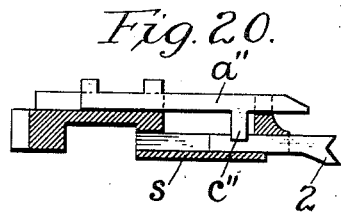
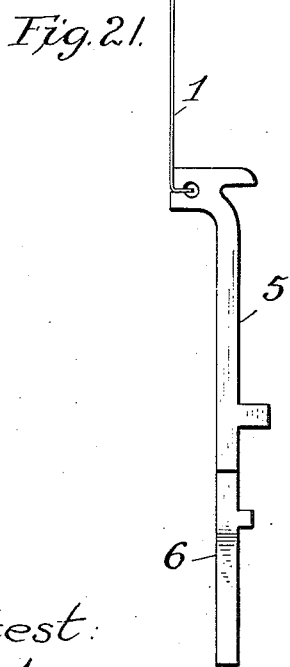
Attest:
Ewd L. Jolson
C E Parsons
Inventor:
Frank Wilcomb,
by Spear, Middleton, Donaldson & Spear
Attys.

UNITED STATES PATENT OFFICE.

FRANK WILCOMB, OF NORRISTOWN, PENNSYLVANIA, ASSIGNOR TO HEMPHILL MANUFACTURING COMPANY, OF CENTRAL FALLS, RHODE ISLAND, A CORPORATION OF RHODE ISLAND.

CIRCULAR-KNITTING MACHINE.

1,131,583.  Specification of Letters Patent.  Patented Mar. 9, 1915.

Application filed October 2, 1912. Serial No. 723,522.

*To all whom it may concern:*

Be it known that I, FRANK WILCOMB, citizen of the United States, residing at Norristown, Pennsylvania, have invented certain new and useful Improvements in Circular-Knitting Machines, of which the following is a specification.

One object of my invention among others is to provide a circular knitting machine employing spring bearded needles for making stockings including the heel and toe pockets, but while my invention is designed primarily for use with spring needles and for making hosiery, I wish it to be understood that certain features of improvement may be employed on machines of the latch needle type for making hosiery, and so far as the use of spring needles is concerned my invention includes features applicable to machines designed for making articles other than stockings, such as underwear.

Figure 10:
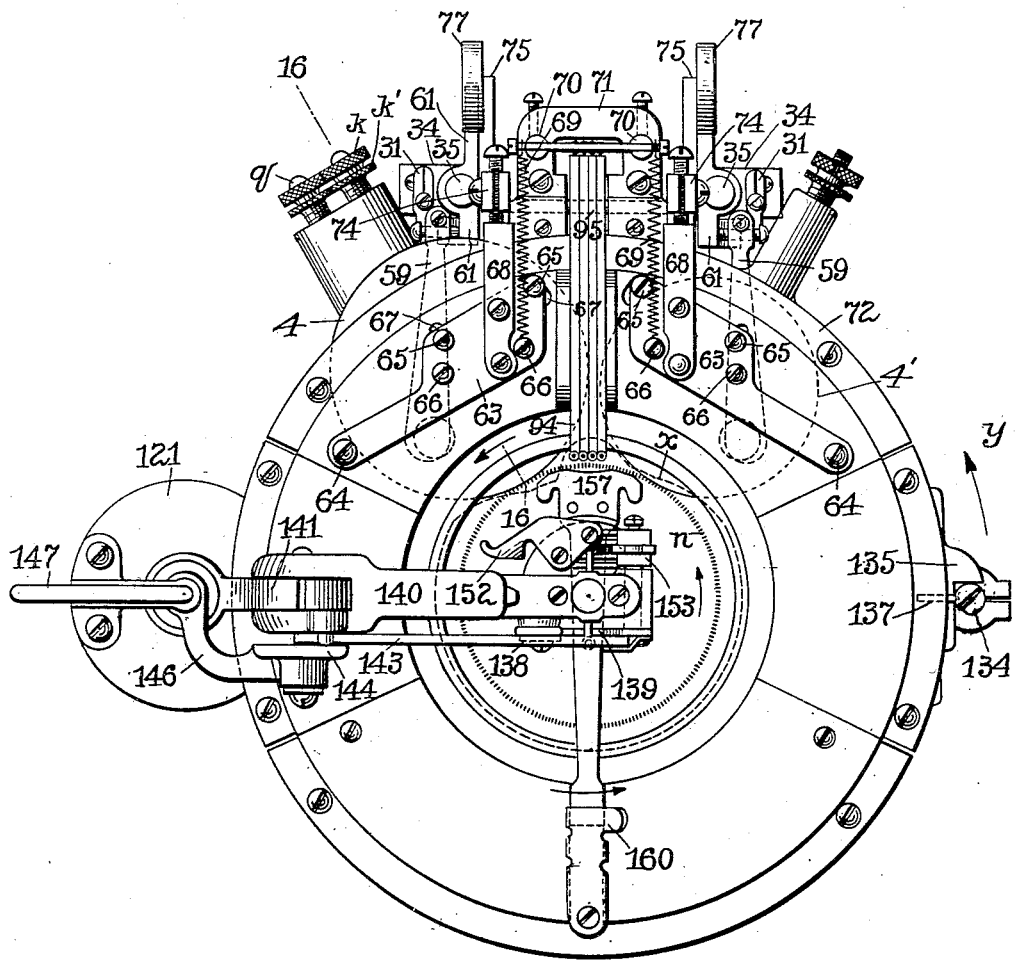
Figure 23:
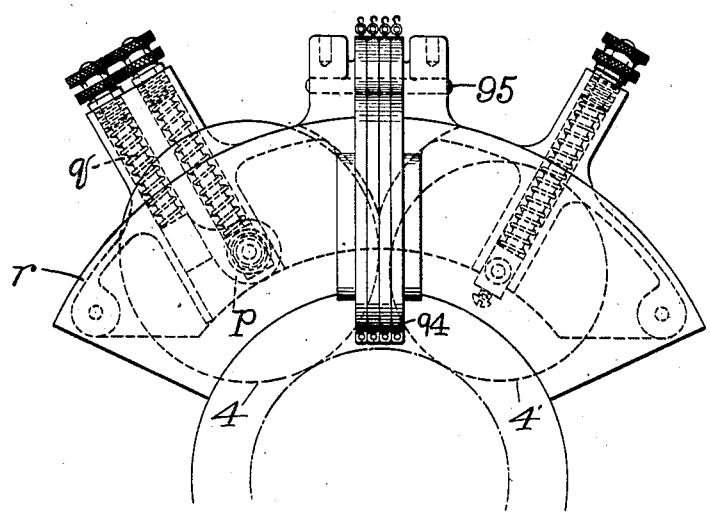
Figure 24:
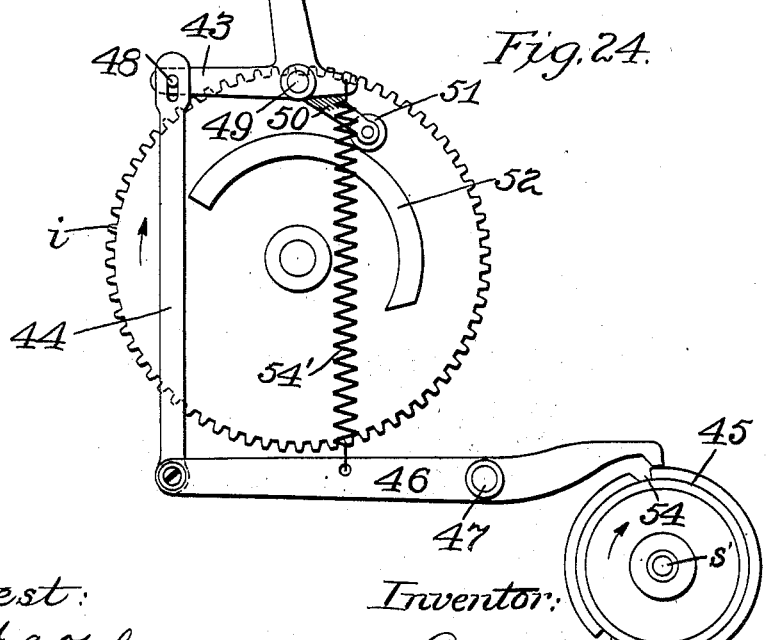

In the accompanying drawings—Figure 1 is a front view of a knitting head embodying my invention, the pattern machine which may be of any suitable kind, being omitted. Fig. 2 is a side elevation looking from the right of Fig. 1, but with some parts omitted. Fig. 3 is a central vertical sectional view looking from the left of Fig. 1, parts being shown in elevation. Fig. 4 is a side view of the thread cutter, clamp and needle evener and the supporting arm for said parts, the view being of the side opposite to that shown in Fig. 3. Figs. 5 and 6 are views of details. Fig. 7 is a central vertical section looking from the right of Fig. 3. Fig. 8 is a bottom plan view of the thread cutter, thread clamp, needle evener and their supporting arm. Fig. 9 is a plan view of a section substantially on line 9—9 of Fig. 1. Fig. 10 is a plan view of the knitting head. Fig. 11 is a plan view in the nature of a diagram of the web-holder and sinker cams. Fig. 12 is a developed view of the cylinder cams for the needle jacks and call jacks, indicating also the picks, this view being taken looking from the inside of the cylinder. Fig. 12ᵃ is a sectional view. Fig. 13 is a sectional view through the needle stitch cam and associated parts substantially on the line 13—13 of Fig. 9. Fig. 14 is a view similar to Fig. 13 but with the parts adjusted to a different position. Fig. 15 is a sectional view substantially on the line 15—15 of Fig. 9 showing the stepped cam for operating the call jacks. Fig. 16 is a sectional view substantially on the radial line 16 of Fig. 10 through the presser wheel and associated parts. Fig. 17 is a view of my improved sinker. Fig. 18 is a sectional view of my improved sinker bed. Fig. 19 is a view of a web holder. Fig. 20 is a view of a different form of sinker in place in its bed. Fig. 21 shows a long butt needle jack with its associate short butt call jack. Fig. 22 shows a short butt needle jack with its associate long butt call jack. Fig. 23 is a plan view of the presser mechanism and thread carriers and their support. Fig. 24 is a detail view of operating mechanism. Figs. 25 and 26 are detail views.

My machine in the form chosen to illustrate my invention includes as knitting elements independently operated spring needles 1, independently operated sinkers 2, to feed the yarn to the needles, independently operated sliding web holders 3, which hold the fabric from being carried up when the needles are elevated to take the thread, and which also assist in casting off old loops, and pressers 4—4′ for pressing the needle beards. I also employ needle jacks 5 and call jacks 6, which latter operate upon the needle jacks to move them into position for operation. These needle jacks as well as the call jacks are each made up of two sets, one having long butts and the other short butts, Figs. 21 and 22.

For convenience I will refer, in the following description, to long and short butt needles, it being understood that so far as certain aspects of my invention are concerned the needle jacks might be omitted and the needles themselves have butts of different lengths.

In latch needle knitting of stockings, during reciprocating knitting for making the heel and toe pockets, practically one half of the latch needles are made inoperative by raising them to a plane above that at which they would knit, as disclosed for instance in Letters Patent of the United States, granted to Hemphill, September 7, 1909, #933,443. In my improved machine, employing spring needles and sinkers for measuring off the yarn for the new loops, I make the needles inoperative by leaving them depressed below the knitting plane and below the sinkers. In this way I avoid sinking the yarn to these inoperative needles, the yarn being sunk only to the operative needles for making the heel and toe pockets.

In latch needle knitting as disclosed in the patent above referred to the knitting of the heel and toe pockets is done on the short butt needles, the set having the long butts being rendered inoperative. In my improved machine, in making the heel and toe pockets, the short butt needles are made inoperative and the long butt needles are operated to make the heel and toe pockets and are also available for control in producing variations in the fabric.

In order to accomplish the results just referred to, I employ call jacks having long and short butts, the long butt call jacks operating upon the short butt needles while the short shank call jacks operate upon the long butt needles, so that while the operation of the picks goes on in connection with short butt elements (though upon call jacks instead of needles) as in the known latch needle practice, the ultimate result of the picking operation takes place at the long butt needles which are available for control in producing a perfect fabric and variations therein.

My machine is of the rotary cylinder type, the cylinder 7 being driven through the bevel gearing 8.

*Needle cams.*—The cam path for the needles, or rather their jacks, is shown at 9, Fig. 12, including an advancing cam 10 and two stitch cams 11, 12, one on each side of the advancing cam for reciprocating work in making the heel and toe pockets, during which operation first one and then the other stitch cam will be effective in drawing the long butt needles down for making the stitches. In round knitting only one stitch cam will be in effective operation. The advancing cam has a cam path beneath it along which the butts of the needles pass, which are inactive. These stitch cams have radial adjustment to carry them out of the path of the short butt needles which, as stated above, I allow to remain down in inoperative position during reciprocating work for making the heel and toe. As these needles are holding the fabric by the old loops suspended thereon the operation of the stitch cams upon them would move them down to their lowest position, or in other words, would give them a movement as low as that necessary to draw new loops, with the result that the old loops would be ruptured. Furthermore, in making heel and toe pockets the stitch cams are adjusted to draw more yarn to make a looser fabric and therefore if the inoperative short shank needles were made to contact with these cams when so adjusted, they would, for this reason, in addition to that above described, cut the old loops which are held thereby. I therefore move the stitch cams radially outward far enough to clear the inoperative short butt needles, but not out of the path of the long butt needles which make the heel and toe. For effecting this movement, the stitch cams are carried on blocks 13, Figs. 1, 2, 9, 13 and 14, slidably mounted on bracket extensions 14 of the cam box, which brackets are supported from the base plate by post 15. The cam carrying blocks are attached by screws 17 to the upper one of a pair of bars 16 slidable in ways in the brackets, these bars being attached together by screws 18, Fig. 13.

The lower bars have pins 19, Figs. 9 and 13, against which work the cam faces 20 of a segment 21, which is supported and guided in a notch of the bar 16. The segment is connected by a lever 22 with the clutch operating lever 23, the latter together with the clutch 24 being similar to that disclosed in the Hemphill patent for securing either continuous rotary movement or reciprocating movement of the cylinder. The lever 22 is pivoted to the frame at 25 and is connected with the clutch lever by the link 26 and the arm 27, which latter is attached to a link 28 hereinafter described, which is attached to the clutch lever.

It will now be seen, when the clutch lever is thrown to the left, Fig. 1, for changing the machine from rotary to reciprocating movement (29 being an oscillating segment suitably driven, and 30 the transmitting gear, all as in the Hemphill patent) that at substantially the same time the segment 21 will be moved circumferentially in the direction opposite the arrow in Fig. 9, and the stitch cams will be retracted radially out of the path of the short butt needles, remaining however in the path of the long butt needles, the result of which is that the long butt needles will be operated for making the heel and toe pockets while the short shank needles which are inoperative and simply holding the fabric, will not pass beneath these cams and will not be moved to their lowest position, which would result in cutting the loops already formed and which suspend the fabric on the inoperative short butt needles.

While as above stated the movement of the cam segment 21 takes place practically at the same time that the change takes place between rotary and reciprocating movement, by the throwing of the clutch 24, the clutch movement takes place slightly in advance of the movement of the segment for which purpose lost motion is provided at 21$^a$ so that the clutch nearly completes its engaging action before the cam segment begins to move. This is true also in changing back from reciprocating movement to rotary. This is to secure proper timing of the movement of the cam to the change in the movement of the cylinder.

The stitch cams are also capable of automatic vertical adjustment, for changing the length of the stitch for making the fabric tight or loose, for instance in continuous circular work where it is desired to have one part of the stocking leg, as the upper part, loose, and another part, as the ankle, tight. The stitch cams have in addition a vertical alternate adjustment, one up and the other down in reciprocating knitting for heel and toe work. This alternate adjustment is to prevent cutting or bursting the loops when the needles which have drawn yarn at one stitch cam are passing in the reverse direction under the same, for it will be readily understood by knitters that these loops having been drawn into the fabric and having rendered from one needle to the next in so doing, should not be subjected to the strain which would result from passing these needles back again under the same cam if the latter were left in position to again move the needles to their lowest limit. To avoid this action I give the stitch cams the alternate adjustment vertically and in unison just described, and by this the stitch cam which on one stroke of the cylinder is down to draw new loops, will be raised and the other stitch cam lowered so that on the return stroke the needle, which has just drawn yarn at one stitch cam and is simply holding the fabric, will not again be operated by this stitch cam to its lowest position, but will pass this cam without being operated thereby and then be projected up to receive the yarn to form the stitch, whereupon it passes under the other cam.

The vertical adjustment first mentioned above, i. e. to knit tight or loose for different parts of the fabric, may be secured in various ways, but in its best form this mechanism consists of a lever 31 pivoted to the cam carrying block at 32 and having its inner end engaging a notch in the post 33, Figs. 1 and 9, to which the stitch cam is secured. This lever is operated vertically by a projection 34, on a rod 35, guided in bearings 36. The cam post 33 is pressed up by a spring 38. The lever forces it downwardly. The rod 35 rests at its lower end upon a bar 39, Figs. 1, 2, 7 and 9, which in turn rests in a channel of a cross bar or yoke 40, which is carried by a bar 41, operated by pattern mechanism in a manner similar to the bar $g^3$ of the Hemphill patent. There is one of these levers 31, and vertical adjusting rods 35 for each stitch cam, and both rods rest upon the bar 39, so that when the yoke 40 is moved vertically the stitch cams will be adjusted vertically through the rods 35, levers 31 and cam posts, that is as the yoke 40 is moved upwardly the stitch cams will move down against the tension of their springs 38, and as the yoke moves down the springs will raise the cam posts and cams.

It will be understood that for round and round knitting only one stitch cam will be in action, but both are moved becauses I utilize the alternate adjusting device as part of the connection for doing it, this alternate action being derived from sliding the bar 39. This bar 39 has cam surfaces 42 so disposed that while one vertical rod 35 is resting on the low part of one cam surface, the other rod is resting on the high part of the other cam surface Fig. 2. By this means the alternate vertical adjustment of the stitch cams, above mentioned, is secured, that is by sliding the cam bar 39, to raise one vertical rod and lower the other.

The cam slide or bar 39 is reciprocated by a link and lever 43, Figs. 2 and 9, the latter being pivoted to the frame and operated by a link 44, which is pattern controlled through any suitable mechanism. The bar 41, which as above stated is similar to the bar $g^3$ of the Hemphill patent, is operated by a cam, a portion of which is indicated at $g$, Fig. 7. There is a contact screw $g'$ by which the bar 41 can be adjusted, to adjust by hand the position of the bar 41, and thus adjust all of the cams controlled by said bar, which as will be described hereinafter, includes the web holder and sinker cams. The stitch cams are also individually adjustable by the screws 31' at the ends of the levers.

In Fig. 2 it will be seen that the rear or right hand stitch cam 11, dotted lines, is down while that, 12, at the front of the machine is up. The cylinder is on its stroke from left to right. Assuming that a stocking is being knit, the needles as they pass under the right hand stitch cam are drawing the new loops, and when all the active long shank needles have passed this cam the cylinder reverses its stroke and at the same time the cam slide 39 is operated by the pattern controlled connections to lift the stitch cam 11 and lower the stitch cam 12 so that on this return stroke the needles which have now drawn the loops into the fabric will not be moved to their lowest position again by the cam 11 and therefore their loops will not be cut on this return leftward stroke, and after passing the cam 11 the needles will be again lifted to take the yarn and will then be drawn down to their lowest limit by the cam 12 to draw these new loops into the fabric, this cam having been lowered, as above described, when cam 11 was lifted, after doing its work on the first stroke to the right. Previous to the next stroke to the right the cam 12 will be lifted and the cam 11 lowered and this alternate though simultaneous movement of the cams will go on while the cylinder is reciprocating for making the heel and toe pockets. When, however, circular work is being done then the cam slide 39 is at rest, that is, it is not reciprocated. For effecting the reciprocation of the slide various pattern mechanisms may be used. As one form I may employ that shown diagrammatically in Fig. 24, which is adapted to be applied to the Hemphill machine. This consists of a cam or pattern wheel 45, mounted on the cam shaft $s'$ of the Hemphill machine which controls a lever 46 pivoted to the frame at 47 and connected to the link 44, which as above stated is connected to the lever 43, this connection being by pin and slot at 48. The lever 43 is on a rock shaft 49, Figs. 2, 9 and 24, which has an arm 50 with a roller 51 to engage a cam 52 on the gear $i'$ of the Hemphill patent. This gear is in constant rotation in the arrow direction. The connections described hold the roller 51 out of the path of the cam 52 during circular work because the lever 46 now rests on the high part of the pattern wheel or cam 45, but when the machine is to change to reciprocating knitting the pattern wheel 45 is moved ahead one step in the arrow direction and the lever 46 falls into the notch 54 under the action of its spring $54'$ releasing the roller 51 so that it is then free to roll on the cam 52 under the action of spring $54'$, this taking place at about the middle of the stroke of the cylinder one way while the roller and cam 52 are in the relation illustrated. When the end of the stroke is reached the roller drops off from the cam and the cam slide 39 moves one way to shift the stitch cams 11 and 12 and when the front end of the cam 52 comes around it lifts the roller and shifts the cam slide 39 in the other direction, and this shifting of the cam slide goes on as long as reciprocating work continues. When circular work is to be resumed the clutch 24 is shifted as in the Hemphill patent and the pattern shafts $s'$ makes a forward step, causing the cam 45 to lift the end of the lever 46 out of the notch 54 and thus holding the cam slide 39 against reciprocation.

*Web holder cams.*—The web holder advancing cams are shown at 55, Fig. 11, pivoted at 56. They are adjustable automatically for knitting to correspond with the adjustment first described above, of the needle stitch cams to get tight or loose fabric and for this purpose they have pins 57 entering grooves 58 in cams or hubs of the arms 59 which have adjusting screws bearing on inclines 60, dotted lines Fig. 2, of arms 61 fixed on the vertical rods 35 above described, so that when the rods are raised by the yoke or cross bar 40 the inclines will move the arms outwardly and through the pin and slot 57, 58, Fig. 11, the web holder cams 55 will be adjusted inwardly to have a greater knocking off movement to correspond with the longer loops drawn by the needles.

When the vertical rods 35 are lowered the web holder cams 55 move outwardly, a spring 62 drawing the arms 59 together for this purpose as the inclines leave the arms.

It will be understood that while both web holder cams are adjusted simultaneously in circular knitting in accordance with the changes in adjustment of the stitch cams only one web holder push or advancing cam is effective in the knitting operation.

When the machine goes on to reciprocating work for the heel and toe pockets the adjustment of the push cams 55 of the two web holder cam sets takes place in opposite directions simultaneously, one being positioned inwardly while the other is positioned outwardly, and this setting of the cams takes place simultaneously with the setting up or down of the stitch cams, for which purpose I utilize, as above described, the same connections which operate or position the stitch cams up or down, i. e. the vertical rods 35, the cam slide 39 and the pattern connections. This alternate adjustment of the web holder cams releases the fabric from pressure on the return or reverse stroke of the cylinder after the stitches have been formed.

Ordinarily in machines as used heretofore, the web holder cam ring has a draw cam for operating the web holders radially outward and two push cams for operating the web holders against the fabric. These two cams are hand adjustable to suit different conditions of knitting tight or loose. The cam ring has a shifting movement circumferentially so that when knitting a heel or toe pocket the web holder cam ring shifts in the direction in which the machine is knitting to bring the web holder cams into right relation to the needles. No arrangement has ever been made previous to my invention, so far as I know, to avoid this reciprocation of the web holder cam ring and at the same time to effect outward adjustment of the web holder cams. By my automatic adjustment the push cam which is in coöperation with the needles when knitting is automatically moved to vary the length of cast off or push back movement according to the loop lengths made in the knitting of the stocking leg or the heel and toe, and a less movement of the web holders takes place when knitting together stitches for the ankle and foot.

By having the web holder cams in two groups the reciprocating movement of the cam ring is avoided, and automatic adjustment for tight or loose knitting is permitted in making different fabric portions and because the cams as a set are fixed instead of circumferentially shifting, connections can be readily made from pattern mechanism to the members it is desired to adjust. By my adjustment also the inoperative cams, that is the trailing cams of the group in the direction of knitting, is withdrawn radially so that the web holders at these cams shall not push against the fabric which would be injurious, tending to make holes.

*Sinker adjustment.*—The sinkers are also automatically adjusted, this adjustment taking place simultaneously with the adjustment of the needles and web holders for tight or loose knitting in the circular work, or for the heel and toe. The sinker cams comprise two groups of like cams for one feed, one for knitting in one direction and the other for knitting in the other direction for making the heel and toe. These two groups are carried by a fixed bed the same as with the needle cams and web holder cams. They are shown in the diagrammatic view Fig. 11, which also indicates the relative position of the web holder cams. One group of these sinker cams is in operative position when the cylinder is turning from left to right, and the other group when turning from right to left. Supposing the sinkers in Fig. 11, are moving in the arrow direction, the group of cams $c$, $c'$, toward the front (on the right of the figure) will be retracted in inoperative position while the rear group of cams $c$, $c'$, (on the left) will be advanced to project the sinkers for measuring off the yarn to the needles. The sinkers 2, Fig. 17, have two butts and a double cam path is necessary indicated by $a$, $a'$. The rear butt of the sinker which travels the path $a$ is the one against which the cam $c$ (at the left of the figure) works when the yarn is being sunk to the needles. The other butt is employed as a guard against overthrow in retracting to receive the yarn, as at $a^2$, a small cam $b$ acting against the front butt of the sinker to prevent this overthrow on the retracting movement to receive the yarn, which is given to the sinker by the cam $b'$. Cam $c$ operates against the outer heel of the sinker to sink the yarn and the cam $c'$ is adjustably connected with it so as to make the path $a$, just wide enough to allow the rear heel of the sinker to pass through. Therefore cam $c'$ becomes a guard cam to prevent overthrow of the sinker when sinking yarn. At the point $d$ of the cam $c'$ the outer sinker heel travels on the rise of the cam $c'$ and withdraws the sinkers from the needles and the sinkers then travel in a concentric path until they come to the cams again. For this concentric travel the sinkers are engaged by the cam piece $e$. The cam $f$ is a guard cam mounted on a removable section of the sinker ring, by the removal of which the sinkers are accessible and which will enable the sinkers to be lined up in proper relation to the cams at this point. The cams $c'$ and $e$ may be continuous with each other and the guard cam omitted.

For giving the sinker cams their adjustment for knitting tight or loose, each pair of cams $c$ and $c'$ is connected to a plate 63, Figs. 1, 2 and 10, there being one plate for each pair. These plates are pivoted to the upper side of the sinker ring at 64 and are connected with the sinker cams by screws, those attaching the cam $c$ being marked 65 and those attaching the cam $c'$ being marked 66. These screws pass down through slots 67 in the sinker cam ring and the screws 66 pass through slots or enlarged openings in the shiftable cam supporting plates 63, so that the cams $c'$ may be adjusted and fixed at different distances from their companion cams $c$ to regulate the width of the cam path. The cam carrier plates are shifted automatically to move the pair of cams $c$, $c'$ in or out by bars 68, Figs. 1, 2, 7 and 10, screwed thereto, and springs 69, the latter being attached to the posts 70 on the bracket 71 attached to the sinker cam ring 72. The bars 68 are borne upon by screws adjustably mounted in the arms 74 of levers 75, which are pivoted to the bracket 71 at 76, said levers carrying rollers 77 resting on the arms 61 at the top of the vertically adjustable rods 35, so that as these rods rise and fall under the control of the pattern mechanism, before mentioned, the bars 68 and sinker cam carrier plates 63 will be moved in or out to adjust the sinker cams, and this adjustment takes place simultaneously with the adjustment of the stitch cams and the web holder cams, all said adjustment being effected by the rise or fall of the bars 35, under the control of the pattern mechanism. These sinker cams also partake of the alternate adjustment of the rods 35 during reciprocating knitting, one set moving in, *i. e.* the set at the left of the Fig. 11 when the knitting is in the arrow direction or in the left to right rotation of the cylinder and the other set of sinker cams being moved back to inoperative position simultaneously with the advance, for sinking yarn, of the cams first mentioned. This alternate action is due to the action of the cam slide 39 raising the rear vertical rod (at the left of Fig. 10) and lowering the front rod, the movement of the rods reversing when the cylinder is on its return stroke.

*Alternate sinker cam adjustment.*—It may be asked why it is necessary to have the sinker cams adjustable and arranged to reciprocate, inasmuch as the sinkers only supply the needles with yarn while the machine is knitting in one direction and the sinkers are passing the leading group of cams, while the sinkers under the opposite or trailing cam are not performing any knitting function and are not engaged with the fabric. When knitting circular work with the machine running in one direction, only one group of cams is necessary for sinking, web holding and stitch forming, but when a heel or toe pocket is to be made two groups of cams are necessary as previously stated for one feed. The web holder cams and stitch cams are adjusted back and forth and in opposite directions, as above described, to avoid bursting the loops. Sinkers, however are automatically adjusted for the following reasons: Heel and toe pockets are made on about one-half of the needles in the circle and at the end of the reciprocation the yarn leads from the thread carrier to the last needle of the knitting set, the distance being about equal to or a little more than one fourth of the whole circumference of the cylinder. This yarn running straight from the thread carrier to the last needle has to be taken up by a thread sweep when the needles are reciprocated in the opposite direction, and if the inactive sinkers were not retracted at the time this long straight piece of thread would lie under the nose of the sinkers and above the needle evener and would hinder free take up by the sweep. Therefore I retract the inactive sinkers, allowing free space for the yarn to be taken up by the sweep. In other words, supposing the cylinder to be on its stroke from left to right, the leading sinkers would be advanced to sink yarn to the needles, but as soon as the cylinder reverses its stroke the cams of these sinkers, which are now inoperative, would be retracted to clear a space for the taking up of the yarn. This relation of the sinkers is illustrated in Fig. 10, $x$ being the line defining the nose ends of the sinkers, wherein it will be seen that the needle cylinder is traveling in the arrow direction, the rear sinkers (on the left) are advanced and are active in sinking the yarn to the needles while the front sinkers (on the right) have been drawn back by the shifting of the sinker cams so that the ends of the sinkers are outside the needle row, indicated at $n$, leaving a space for the take up of the yarn at the time these sinkers as a group were shifted from their active to their inactive positions.

*Presser mechanism.*—The presser wheels 4—4' are set with relation to the needles and sinkers, as shown in Figs. 10 and 11 and 16, and at this point the sinkers are always projected inwardly between the needles far enough to sink the required amount of yarn which is always sufficient to allow the lower nose to be inside the needle row allowing the presser to roll on the needles behind this nose as in Fig. 16. The pressers 4, 4' comprise preferably wheels which are adjusted by their rods screw threaded at their ends and engaged by jam nuts $k$, springs under adjustment of nuts $k'$ forcing the pressers inwardly to exert a yielding contact with the needles. The rear presser is made up of a plain wheel and a notched lower wheel $l$, Fig. 16, the upper wheel having fixed thereto a pin $m$, turning in a bushing $m'$, mounted in the block $o$ and held by a set screw $n'$, while the lower wheel has a bushing fixed thereto and mounted to turn in a bracket $p$ extending from another adjusting rod $q$, which has a spring and adjusting nut for adjustment like that above described. These two presser wheels are mounted one above the other but their supporting and adjusting means are arranged side by side in the same plane and in a bracket $r$, attached to the sinker ring. The bushing $o$ is of large enough internal diameter to allow one presser wheel to be adjusted in relation to the other so that the notches in one wheel may be exposed for tucking as is well understood by knitters. In the present instance I have shown the lower presser wheel as notched.

I have shown two pressers disposed at different points about the needle circle for reciprocating work, one being effective on one stroke and the other on the other stroke of the cylinder. In plain circular work of course only one presser would be effective, for instance the needles would miss the front presser because the call jacks do not throw the needles up high enough on the rising side of the advancing cams to bring them into contact with the presser, but having been lifted by the advancing cam to be moved down by the draw cam they will traverse a path to have their beards pressed by the presser.

*Call jack cams.*—The cams for the call jacks include a central lifting cam 78 Fig. 12, which lifts the active call jacks to push the needles up into engagement with the advancing cam 10 to be operated thereby, and like this advancing cam the lifting cam has a path 79 below it, this being for the inoperative call jacks which in passing along this path remain down and do not push their needles up to be operated by the advancing cam 10. The call jack cams also include a stepped cam comprising the upper and lower members 80, 81, Figs. 1, 12 and 15, with a passage way between them, these cams being carried by a slide or post 82 vertically movable in the cam box 83 and connected with mechanism for controlling said cam automatically as will be hereinafter pointed out. This stepped cam as shown in Fig. 15, has its lower member 81 reaching in far enough to engage and elevate all long and short butt call jacks but the upper member 80 reaches in far enough to engage only the long butt call jacks and make them inoperative by depressing them below the plane of the lifting cam 78.

For operating the stepped cam its post is connected with an arm 100, Figs. 1, 2, 3, 9 and 15, guided vertically in the standard or post 101 at the front of the machine, said arm being connected to a pin 102, which has a projection entering an inclined cam groove 103 in a plate 104, slidably mounted in the frame, and connected by a latch 105 with a bar 106, which is mounted for reciprocation and is connected by a pin 107 with the link 28, above mentioned, connected with the clutch lever 23, so that when the clutch lever is thrown to change the movement of the cylinder from rotary to reciprocatory the grooved cam 104 will be simultaneously operated to depress the arm 100 together with the stepped arm 80, 81, and thus the long butt call jacks will be depressed to leave their needles, i. e. the short butt needles, in their low position, and hence as they will not pass under the advancing cam they will be inoperative. The latch 105 is provided to disconnect the cam slide or plate 104 from its automatic operating means, i. e. the clutch lever 23 so that the cam plate may be operated by hand to lower the stepped cam for a purpose hereinafter described. The latch is normally held in engagement with the cam plate by a spring 108.

The call jacks are frictionally held in the cylinder grooves to remain in any position until positively operated, for which purpose they may be restrained by an encircling spring or they may have their stems slightly bent to frictionally engage the walls of the cylinder grooves.

*Picks.*—The picks are indicated on the diagram Fig. 12, and in Figs. 1, 2 and 9, those for narrowing at 84—84' and those for widening at 85—85'. The picks are all mounted on inclined axes substantially as in the Hemphill patent. The arms of the narrowing picks are pivoted to the standards 86, while those of the winding picks are mounted on a bracket 87 in which a bar 165 is movable vertically, said bar having inclined ends engaging the pick arms, the bar being raised or lowered to control the picks, the bar being on a pin 166 guided in the frame, pressed down by a spring 167 and pressed up by a lever 168 pivoted to a frame and controlled by the pattern mechanism through the link 169, this lever being similar to the lever $k^2$ of the Hemphill patent with the exception that it is operated to reverse the control of the widening picks in my machine from that of the Hemphill patent.

*Thread carriers.*—The thread carriers are shown at 94, Figs. 7, 10 and 23, there being a number of these for introducing different kinds of thread, as will be hereinafter described. These carriers consist of arms having openings or eyes at their ends for the passage of the threads, and each arm is pivotally mounted at 95 on the sinker ring 72 so that it may be raised and lowered to remove or introduce its thread, and for this purpose the tails of the thread carriers are in line vertically with the levers 96 pivoted to a housing 97, these levers in turn being operated by levers 98 also pivoted to the housing and operated through wires 98' Figs. 2 and 7, running to the pattern mechanism like the wires $f^4$ of the Hemphill patent. The thread carriers are lowered to their work by springs 99 when allowed to do so by the pattern connections.

*Stocking machine.*—I will now take up the order of the workings of the cams, yarn levers and various connections which are successively operated to produce a seamless stocking so called, or a circular fabric having narrowed and widened heel and toe pockets illustrating the making of a lady's stocking. The stocking may be commenced at top of leg or at the toe, as is well understood. In this case I will begin at the top of leg ending at the last course of knitting the toe.

Supposing the needle cylinder is rotating the reverse of clockwise and that the left side of Fig. 2 is the front of the machine. At the beginning we aim to knit the fabric with long loops, making it loose, and my machine having a revolving needle row and fixed cams will be set to knit very loose. The elevating bar 41 corresponding to Hemphill's bar $q^3$ is lifted to a high point on its cam wheel together with the vertical rods 35 having the stops or supporting means 34, 61 for the levers connected with needle cams, sinker cams and work holder cams. At this time rod 35 at the right of Fig. 2 will be elevated to its highest position by the cam slide 39 and the front rod 35 (at the left) will be depressed, allowing the cams of the front group 12 or those at the left of the machine in Fig. 2 to be inoperative, having no effect on the knitting. At this time the sinkers of the rear group of knitting elements are delivering a maximum amount of yarn and the web holders are knocking over to their maximum extent and the needles at cam 11 are drawing down to their maximum limit, all tending to produce loose knitting. At this time also one of the set of thread carriers is feeding what we call the garter top thread. The knitting goes on in knitting circular fabric, a predetermined distance as provided for by the pattern mechanism similar to that of Hemphill patent. Having reached a point in the leg of the stocking approximately at the beginning of the calf of the leg the cam shaft (see Hemphill patent) at this time is moved ahead one step and the yarn carrier is automatically raised from the feeding position and another carrier introduced with another kind of yarn and the same movement of the cam shaft slightly lowers the vertical cam bar 41, which lowers the slide 39 and the rods 35, consequently shortening the sinker, web holder, and needle movement making slightly tighter fabric. Continuing to knit a predetermined distance we reach a point near the ankle of the stocking. Another step movement of the cam shaft still further lowers the cam bar 41 and still further shortens the stitches to make a close knit ankle. A short distance before making the heel another step movement of cam shaft automatically brings the high splice or reinforcing thread into play. This carrier feeds a supplemental thread half way around the tube in the well known manner. When the point is reached where the heel operations are to begin the cam shaft is operated another step and the clutch 24 is thrown to change the movement of the cylinder from rotary to reciprocatory, and one of the thread carriers introduces a different yarn or yarns for the heel, the same movement which throws the clutch into the reciprocating mechanism withdraws the stitch cams radially out of the path of the short shank needles, by means of the cam segmen 21 and depresses the stepped call jack cam 80, 81 through the connections above described operated through the link 28 and at this time all the long butt call jacks are on the opposite side of the machine from the stepped cam so that when the cylinder turns in the opposite direction all the long butts come into engagement with the upper cam 80 of the stepped cam and are depressed into a lower position than that which they occupied when knitting circular work, and this upper cam 80 being farther away from the cylinder than the lower cam 81, the short butts of the call jacks do not come in contact with the upper cam 80 and therefore they continue in their operative position in the higher plane. The cylinder is now reciprocated in the ordinary way and approximately half of the needles, i. e. those controlled by the long butt call jacks are inoperative, remaining in a low plane because their call jacks remain lowered and the hook end of the needles are now too low to receive yarn from the sinkers, the sinkers feeding only such needles as are being operated upon to elevate them by the call jacks operated by the call jack lifting cam 78.

At each reciprocation the narrowing picks 84, 84' depress a short butt call jack, one at a time, into the low plane to pass inoperatively below the lifting cam 78 and leaving its corresponding needle inoperative also. The picking operation is continued until the pocket is sufficiently narrowed, then the widening picks 85, 85' are brought by their controlling mechanism into alinement with the short butt call jacks, which picks raise two jacks at each reciprocation of the cylinder and the narrowing picks still picking one jack at each reciprocation the ultimate result of which, in widening, is that one needle is brought into action at each reciprocation of the cylinder until the pocket is sufficiently widened. During all this heel and toe pocket operation the stitch cam sinkers, and web holders are making longer loops than were made in the knitting preceding the heel and toe pockets. The pocket now being completed another step of the cam shaft throws the clutch 24 into engagement with the mechanism for rotating the cylinder and at the same time through the cam plate 104 raises the stepped cams 80, 81 which in turn raises all the long butt call jacks from their lowest inoperative position to the higher plane and the stitch cams having now been shifted inwardly closer to the cylinder and in the path of the short as well as the long butt needles, all the needles now become operative. The vertical cam bar 41 was raised simultaneously with the change from reciprocatory to round and round knitting to knit a tighter fabric and the heel yarn replaced by another yarn and circular knitting goes on through the foot portion to the toe pocket. The toe pocket is made precisely as above described for the heel pocket, and the toe pocket when completed ends the operation of knitting the stocking.

By having the picks operate upon jacks instead of upon the needles coarse gage jacks may be employed to narrow and widen while the needles may be of fine gage and a fabric of small diameter may be made while the jacks are arranged in a circle of much larger diameter. While I have described and shown the invention as applied to a spring needle machine, certain features are applicable to a latch needle machine and as to these I do not limit myself to any particular type of machine whether spring needle or latch needle. The machine may be used for latch needles by omitting the sinkers and pressers, and it may be organized for producing underwear in which event it would be rotated in one direction only and one set of cams for each of the knitting elements used, i. e. needles, web holders or sinkers would be omitted.

*Sinkers and pressers.*—I have designed a new form of sinker which will allow the pressing device 4 or 4' to be arranged outside of the needle row and between the said sinkers and the web holders, this arrangement being particularly adapted for use in a stocking machine having its space inside the needle row occupied by thread clamping and cutting mechanism, the arrangement being also adapted for other types of machine, as for instance, for making underwear. A sliding sinker of ordinary form could not be employed on the outside of the needle row in conjunction with a presser device located wholly outside of the needle row because the bed for an ordinary sinker would occupy all the space necessary for the presser device. I have therefore devised a form of sinker and a form and arrangement of the sinker bed by which the sinker bed can be located above the place usually occupied by a sinker bed and thus leave space in which the presser device may be located.

My improved sinker comprises a stem $a^x$, Figs. 3, 7, 16, 17, having a shank or shanks $b^x$ to engage the sinker cams above described, and an arm $c^x$ extending downwardly and forwardly from the stem and terminating in a nose of substantially ordinary construction. The stem being elevated in respect to the work end or arm of the sinker enables me to employ a sinker bed which is elevated above the plane usually occupied by it and this leaves space for the pressers 4 or 4' which may thus be arranged in proper relation to the needles, sinkers and web holders, namely in a plane between the sinkers and web holders and on the outside of the needle row. The sinker bed is of improved construction being grooved in its upper side Fig. 18, for the stem of the sinker and grooved at $d^x$ in its lower side for the work arm or lower nose carrying extension, with a vertical opening at $e^x$ in line with the upper and lower grooves through which the depending arms of the sinkers extend.

The upper grooves of the sinker bed lying in a circle of large diameter in respect to the needle circle provide outlying portions having thick walls between the grooves for guiding the stems of the sinkers, and sustaining lateral thrust, while the lower slots being nearer the needle circle than the outlying portions have thin walls but these are sufficiently strong for guiding the lower arms of the sinkers which are not subjected to the lateral thrust of the cams. The butts of the sinker stems for engagement with the cams being at the outer ends of the sinkers low angle cams can be used. The sinker in its best form will have its stem projecting forward of the depending arm and running in a groove $h$ forming a continuation of the upper groove. This extension will prevent the sinker from tipping downwardly at its work or nose end while upward tipping will be prevented by the lower arm of the sinker bearing up against the under side of the sinker bed. This form of sinker bed provides for keeping oil, lint or other matter from passing from the sinker cams and grooves of the sinker bed to the fabric.

The removal and insertion of the sinkers is easily effected by raising the rear butt portion and drawing it upward and outward from the machine.

As a modification of the sinker I may, as shown in Fig. 20, form it in two parts, an upper stem portion $a''$ and a lower work portion, these being connected together by an arm or rib $c''$ on the upper stem portion fitting in a notch in the lower work portion. In this case I would use a plate $s$ fixed under the sinker bed to hold the work portions of the sinkers in the grooves.

The arrangement of the presser device outside the needle row in a stocking machine, as above stated, leaves the central portion of the machine free for the arrangement of the thread cutter and clamp but furthermore an inside presser would be open to objections other than that of occupying the center of the machine necessary for the location of the other devices. For instance in making a heel pocket, at which time the fabric gathers up, or in case the fabric for any reason gathers up, as in the case of a defective needle, an inside presser would be liable to be forced away from the needle and not perform its function. In my arrangement with the presser outside the needle row this objection is avoided. The presser wheel being located under the sliding sinkers, as above described, and the sinkers being always advanced at the point where the sinking takes place the said sinkers serve as a guard to prevent anything coming between the presser and the needles.

*Web holders.*—My improved web holder Figs. 3, 7, 16 and 19, has a lower extension $t$ working in a groove $t'$ of a ring $u$ secured to the top of the needle cylinder. This groove extends circumferentially of the ring, and it is open throughout, having no radial grooves for these lower extensions. The upper side of this groove is ground and affords a bearing to hold the web holders against tipping. The upper work end or extension $v$, of the web holder runs in radial grooves at the top of the ring but these grooves are shallow affording rigidity to the guiding walls and making the construction comparatively inexpensive to manufacture. By this form of web holder and ring the upper work-end is bottomed in the upper grooves while the lower extension slides on the plain upper side of the circumferential groove, thus firmly and accurately guiding the web holder.

The web holder bed $w$ is clamped by screws 109, Figs. 1, 3 and 11 to the cylinder, and the web holder cam ring 110, which overlies and is supported by the bed is held against circumferential displacement by adjusting screws 111 passing through ears 112 on the ring and bearing upon the sides of the front standard 101. The web holder cam ring is held down on the web holder bed by clips one of which is shown at 113, Fig. 11, secured to the cam ring and entering a circumferential groove 114 in the web holder bed.

*Shifting sinker organization.*—The sinker cam ring 72 is composed of upper and lower members screwed together, between which the sinker bed is located. This sinker bed has gear teeth 115 into which meshes the split gear 116, Fig. 3, clamped on the reduced end 117 of the vertical shaft 118, which carries a gear 119 at its lower end meshing with the gear 8' on the needle cylinder. The sinker supporting ring 72 is carried or supported by a bracket 120 turnable on the upper end of the standard 121 which extends up from the base of the machine and through which standard the vertical shaft 118 extends. This bracket is also movable vertically and it carries the shaft with it because the flange 122 forming part of the split clamp 123, which holds the gearing to the shaft, is pinned to the said shaft. Below the bracket a yoke or collar 124 is located connected by a link 125 with an eccentric or crank 126 on a shaft or pin 127 journaled in the standard and operated by a handle 128. When this handle is turned down from the position shown in Fig. 3, the yoke will be lifted to raise the bracket together with the sinker ring supported thereby to the position indicated in dotted lines at x Fig. 3, and then the sinker ring, together with all the parts carried thereby may be swung aside in the direction of the arrow y, Fig. 10, this turning movement being about the axis of the shaft 118 as a center. This will enable access to be had to the cylinder, needles, web holders and their cams. At all times the gear connection between the cylinder and the sinker organization will be maintained so that these will be operated in unison.

The yoke 124 is kept from turning by a spring pin 129 mounted in the standard 121, the spring 130 being housed in the hollow pin and bearing at its lower end upon the block 131 supported on a pin 132 fixed in the standard. The upper end of the spring pin fits between the ears of the yoke as shown. A dowel pin 133 aids in centering the yoke.

In swinging the sinker organization back to working position it is arrested by a stop 134 fixed to the standard or post 101, which is engaged by a projection 135 on the sinker ring. When so arrested the sinker ring has a notch registering with the stop or registering pin 137, and thus by lowering the sinker ring the notch thereof will be engaged by the pin 137 and the sinker ring will be held centrally in respect to the axis of the needle cylinder and web-holder organization.

It will be observed that the lower part of the sinker ring encircles the web holder organization fitting closely, when lowered to working position about the cam ring 110 of the web holders. This centralizes the upper end of the cylinder and the web holder organization and furnishes lateral support for these parts and insures the true running of the needle cylinder. In the case of a small diameter machine and a tall cylinder very small variations in the bearing at the base of the cylinder will be multiplied at the top of the cylinder resulting in a wabbling motion at this point and uneven knitting if no provision were made to avoid this. With the sinker organization arranged and supported by the standards 101 and 121, and closely surrounding the parts at the top of the revolving cylinder the latter will be made to run true.

*Thread cutter, clamp, and needle evener.*— As is customary in stocking machines which make the heel and toe, I provide on the inside of the needle row a thread cutter and a thread clamp. Referring to Figs. 3, 4, 7 and 10, this cutter includes a fixed blade 138 and a movable blade 139 both mounted on a bracket 140 which is pivoted on a standard 141 fixed to the sinker ring. The movable blade is pivoted at 142 and is operated through a rod 143, connected to a disk 144 pivotally mounted on the standard at 145, the arm 146 of said disk being operated by a rod 147 engaging therewith at a point in line with the axis about which the sinker ring is turnable. The supporting bracket may be turned upwardly about its pivot 145 to remove the same from over the needle cylinder and thus remove the parts carried thereby from within the sinker ring. This bracket also carries the clamp for the loose ends of the threads severed by the cutter, this clamp comprising a rigid clamping member 150, Fig. 4, and a movable clamping member 151, the latter being of grating form, Fig. 8, and being arranged below the fixed solid member to shed dust, lint, &c., which might otherwise interfere with the clamping members coming close together. The thread is guided to the clamping members by a guide or guard plate 152. The movable clamping member is carried by a block 153, Figs. 4, 6 and 7, on the shaft 154 to which the movable cutter blade is fixed, said block being turned by a pin 155, Fig. 6, on the shaft engaging the block, provision for slight lost motion being made between the pin and the surface of the block with which it contacts. The movable clamping member is held up by a spring 156. Now when the movable cutter blade is lowered to receive the thread between it and the fixed cutter blade, the movable clamping member will be lowered to receive the thread between it and the upper fixed member, the thread being guided in between these parts by the guide 152. The movable cutter blade now rises allowing the clamp to be set first to hold the thread, and then the cutter continuing its movement upward will sever the thread, leaving the loose end in the clamp.

I provide on the inside of the needle row a needle evener 157, Figs. 4, 7 and 10, to even up any needle which may have been bent, this evener being operative adjacent the point at which the yarn is sunk to the needle, as shown in the plan view Fig. 10. It lies slightly below the plane of the sinkers, Fig. 7, and is carried by an arm 158 pivotally mounted at 159 to the underside of the supporting bracket. The arm is bent upwardly and extends over the sinker ring where it is engaged by a catch at 160 by which it is locked in position, and this arm therefore acts as a lock to hold the bracket 140 down in working position with all the parts carried thereby properly located within the needle circle. To swing the bracket up the evener carrying arm is turned from under the catch in the arrow direction, Fig. 10, and on swinging the bracket upwardly in the direction of the dotted arrow, Fig. 3, the clamp, cutter and needle evener go up with it, above and to one side of the needle row, to allow access to the interior of the needle cylinder or to allow the sinker organization to be shifted aside in getting access to the web holder organization.

In the operation of the clamp and cutter, when the thread carrier is raised the thread extends from this to the needle last supplied and is carried around by revolution of the needle cylinder and under the guide which directs it between the clamping members. After the thread is severed the loose end is held by the clamp until again introduced by the thread carrier.

It will be seen from the foregoing description that the sinker ring supports various devices, the cutter and clamp, needle evener, the thread guides, pressers and part of the connections for adjusting the sinker cams and when the sinker ring is swung aside all the said parts move therewith and the act of moving the sinker ring back to normal position establishes the necessary connection for operating the thread carriers and adjusting the sinker cams.

Reverting to the stepped cam 80, 81, and the mechanism for operating the same, as stated, this mechanism includes a latch 105 by which the stepped cam can be disconnected from its automatic operating mechanism to enable the said cam to be adjusted by hand, namely, by sliding the grooved cam plate 104 manually. This hand adjustment is to permit the cam to be depressed for operating the long butt call jacks into their inoperative or lowest plane making the corresponding needles also inoperative in their low plane and thus allowing the sinker organization to be swung aside without interference by the needles. It will be understood that at certain times the sinker organization can be swung aside without necessitating the manipulation of the stepped cam 80, 81, for instance, when the machine is on heel and toe work for at that time one-half the needles are inoperative and it is necessary only to turn the cylinder to bring this inoperative or lowered set of needles in proper position to allow the sinker ring to swing over the cylinder. At other times, as when on the leg and foot, the hand adjustment is necessary for lowering the needles, it being understood that when the cam is properly adjusted the needle cylinder is turned sufficiently to get all the needles lowered to allow the sinker ring to swing clear. By using the instep or stepped cam for lowering the needles I avoid having to lift the dial so high as to avoid the elevated needles.

Reverting to the laterally adjustable stitch cam in connection with the long and short shank needles, it will be understood that this part of my invention is not limited in its application to machines for making hosiery, nor to machines of the spring needle type. For instance, the long and short butt needles may be arranged in two groups or alternating, and the needle cam arranged to automatically engage all the needles at times and only the long butt needles at other times for producing designs or so called lace knitting, and in connection with the yarn changing devices vertical stripes of different colors may be produced and by automatically adjusting the cam vertically to draw the long butt needles lower than the short butt needles, and then raising the cam and operating on all needles variations in the stitches may be produced, the loops on the long butt being very much longer than those produced on the short butt needles.

*Interchangeable needle cylinder.*—The needle cylinder is composed of an upper part 7, of one diameter and a lower part of a larger diameter 7ª, Figs. 3 and 7. The small diameter portion has grooves for guiding the needles, while the larger diameter portion has grooves for guiding the jacks 5. These jacks have upper head portions 5ª projecting radially inward and detachably engaging with the needle heels and they have outwardly projecting nibs 5ᵇ to act in connection with a guard cam to prevent overthrow, as will be described hereinafter.

The upper small diameter portion of the needle cylinder is supported on the lower portion by a spacing ring 161, and in order to change from one diameter of needle carrying portion to another a different diameter of spacing ring is employed to reach in more or less according to the diameter of cylinder desired, but it will not be necessary to change the lower part 7ª of the cylinder or the cam box and this provision is made for furnishing machines of different sizes without changing the cam box or the lower part of the cylinder. In making these changes, needle jacks having different lengths of heads would be employed. Another advantage of the construction just described is that a fine gage machine can be provided with needle jacks running in grooves with thick walls, the jacks themselves being thicker than would otherwise be possible, only their noses being thinned to suit the grooves in the fine gage cylinder. By this construction also cams of a low angle can be employed for operating the needle jacks, these cams being arranged in a circle of a diameter much larger than the needle circle.

It will, of course, be obvious that the call jacks 6, when these are used, are guided in the grooves of the lower cylinder portion 7ª.

*Facing cams.*—As above set forth the two stitch cams have radial as well as vertical adjustment. In front of these cams I arrange facing cams 162, Figs. 12, 13, 14. These are thin plates fixed to the cam ring or box and are of substantially the same form as the stitch cams at their lower edges, but their bottom edges do not reach down as low as the lower edges of the stitch cams, and they are thus too short to draw the needles low enough to cast off the loops from the needles. They are at all times close to the cylinder and serve to prevent the needles or jacks from having any objectionable tipping or radial displacement, which they might have when the switch cam is drawn back, were the facing cams not provided. These facing cams also serve another purpose in that they insure a low position of the short butt needles, which are to be rendered inoperative, that is to say, a position low enough to insure their passage under the advancing cam 10. In this way any needle which is to be inoperative and has become misplaced for any reason, will be moved low enough to insure its passage below the advancing cam instead of above it. These facing cams perform this function when the stitch cams are moved radially out of the path of the short shank needles. As above indicated, however, the facing cams do not lower the needles as far as would result in strain on the loops which suspend the fabric on these inoperative needles.

The angles of the facing cams are made as low as possible and considerably lower than those of the stitch cams. The lower edge of the facing cam has a recess on its rear face Figs. 13, 14, receiving a projecting lip 163 on the stitch cam. The object of this construction is to enable the stitch cam to work as near as possible to the cylinder on the short shank needles (or jacks).

The object of the difference in the degree of incline or the angles of the facing and stitch cams is to make the facing cam guard or protect the corner of the projecting lip of the stitch cam, the said corner never coming low enough for a jack shank to come in contact with it, which of course would cause breakage of the jacks.

*Jack guard cam.*—It will be understood that needles traveling up and down in the grooves, under considerable velocity, tend to overthrow, and travel beyond the operating surface of the cam, producing lines, holes or long stitches or other imperfections. To prevent this overthrow I have provided a hand adjustable guard cam 164 so connected with the stitch cam that it automatically coöperates with the stitch cam whether knitting loose or tight stitches. The sliding post 33 carrying the stitch cam is automatically adjustable up or down by lever 31, as above described, as well as adjustable by hand. The cam post has an upwardly projecting stem to which is attached the hand adjustable flanged block 164, the flange extending under the upper nib 5ᵇ of the needle jack and it may be adjusted to exactly conform to the distance between the upper nib 5ᵇ and lower shank of the needle jack, and as the post is operated to draw longer or shorter loops the guard cam effectually prevents any lost movement between the stitch cam and the guard cam. While I have shown this jack guard as used in connection with the stitch cam it is equally advantageous as a guard to prevent the needles overthrowing at the point where the presser wheel depressed the needle beard.

My improvements are applicable to a circular knitting machine having a plurality of feeds, as in the case of machines for making split foot stockings where two feeds are required, the sole and instep being knit of different yarns. In such a machine the cam slide 39 would take the form of a ring or segment extending about the knitting head, each feed having a like set of connections for adjusting the cams of the knitting elements like those described as leading from the cam bar or slide. Such a form of double feed machine is illustrated in Letters Patent of the United States granted to E. H. Walker #1034665, August 6, 1912, and Parquette 985927, May 7, 1911, which shows a developed Hemphill patented machine. This ring besides its automatic adjustment would be adjustable by hand for the simultaneous adjustment of the cams. Each feed would have its cams operated by the vertically movable bar or rod 35, the said rods being raised or lowered by the segmental ring shaped cam bar. Each feed would have the independent hand adjustment for each cam set, as needles, web holders and sinkers.

It will be understood that while I have described particularly mechanism operating the various parts and for performing the functions described, these mechanisms may be varied and the desired ends attained, and I therefore do not limit myself to the mechanisms described.

*Picking operation.*—In the developed view of cylinder cams, Fig. 12, supposing that for circular knitting the needles travel in the direction of the arrow, or rather the call jacks, the cams being fixed, and that the picks are as shown in full lines the shank of the call jack, which first strikes the narrowing pick 84' at the right of the cam 78, will strike under the shoulder of the pick and the continued movement of the jack will cause the pick to move down because of its angular mounting, and this jack will be carried down and all the other jacks will pass over this depressed pick, and then they will be raised by the lifting jack cam 78 to raise the needle jacks into connection with the advancing cam for lifting the needles to take the yarn. Passing on, the call jacks will pass over the narrowing pick 84 and on the next round they will continue to pass over the lowered pick 84', which is held down by the shanks riding over it and the call jacks will continue in the path just stated as long as circular knitting continues. The call jack which was depressed by the pick 84' will pass under the lifting cam after it leaves the pick, and on arriving at the instep cam which during circular knitting is in its uppermost position, this jack will be raised and will then pass over both narrowing picks and over the lifting cam as just described, to take part in the knitting, and this course of the jacks will continue as long as circular knitting is done. During the operation just described the widening picks, are in intermediate position, indicated in full lines, Fig. 12, and the shanks of all the call jacks pass by them. These widening picks are normally pressed downwardly by the spring 85ˣ which draws them together or toward each other, they being mounted on inclined bearings which cause them to assume this low position under the tension of their spring. When the heel or toe is to be formed the clutch 24 changes the movement of the cylinder from rotary to reciprocatory and at the same time the instep cams 80, 81, are lowered. At this moment all of the long shank call jacks are on the opposite side of the machine from the instep cams so that as the cylinder reverses and turns in the opposite direction all the long shank call jacks engage the upper cam 80 of the instep set and are thrown down into a low position, in which position they will pass under all the picks, lifting the right hand pick which was depressed, or rather allowing it to rise under the action of its spring and it will thus assume a position in line with the short shank call jacks, and the first one which strikes the pick will be carried down and when the end of the row of short shanks pass over this pick it will rise. Those short shank call jacks which follow the first one (which is now lowered) will pass up over the lifting cam 78 and over the pick 84, until the last one of the row passes over this pick. On the reverse movement of the cylinder this last call jack, which now becomes the leading one, owing to the change of direction of the cylinder, will strike the pick 84, which being moved by this contact, will carry this call jack down, all the other call jacks moving over the pick and past the same, whereupon it rises to be in position for picking down the next call jack at this end of the row, when the cylinder stroke again changes.

*Widening.*—During the above operation the widening picks 85, 85', Figs. 1, 7, 9 and 12, are in an intermediate position, that is half way elevated, as shown in full lines Fig. 12, this being due to raising the block or stop 165 half way. The jacks, which have been lowered for narrowing, pass below these picks and those which are knitting pass above. For widening the picks 85, 85' are lowered by lowering the block 165 and the jacks as they strike these picks are elevated thereby into operative position in line with the lifting cam, it being understood as in ordinary practice, that the upward movement of the picks is due to the pressure from the jack shank and the inclined position of the axis about which the pick arm turns. For operating the block 165 it is fixed to a rod 166 pressed downwardly by a spring 167, and moved upwardly by a lever 168 operated from suitable pattern mechanism through link 169. Cams 170 are placed outside the cam box as guards to prevent overthrow of the call jacks.

Certain claims have been omitted from this specification on a requirement by the Commissioner of Patents on a question of division, and such claims or a part thereof will be embodied in a divisional application.

As shown in Fig. 3 the upper cylinder is held to the spacing ring by the screw 7ˣ, and the spacing ring to the lower cylinder by the screw 7ʸ.

I claim:—

1. In combination in a circular stocking knitting machine, a cylinder having rotary and reciprocating movement, long butt heel and toe needles and short butt instep needles, mechanism for changing the cylinder from rotary to reciprocating movement and controlling mechanism for knitting on both the long and short butt needles during circular work, and for rendering the short butt needles inoperative, and knitting on the long butt needles alone during reciprocating work, including means for rendering the short butt needles inoperative, and a stitch cam adjustable radially of the machine out of operative relation to the short butt needles, substantially as described.

2. In combination in a circular stocking knitting machine, a cylinder having rotary and reciprocating movement, long butt heel and toe needles and short butt instep needles, mechanism for changing the cylinder from rotary to reciprocating movement, and controlling mechanism for knitting on both the long and short butt needles during circular work and for rendering the short butt needles inoperative, and knitting on the long butt needles alone during reciprocating work, including means for rendering the short butt needles inoperative, and a stitch cam adjustable radially of the machine and vertically in relation to the plane of movement of the needles, substantially as described.

3. In combination in a circular stocking knitting machine, a cylinder having rotary and reciprocating movements, long and short butt needles, cams for operating the needles, mechanism for changing the cylinder from rotary to reciprocating movement and controlling mechanism for knitting on both the long and short butt needles during circular work and for rendering the short butt needles inoperative and knitting on the long butt needles alone during reciprocating work, substantially as described.

4. In combination in a circular stocking knitting machine, a rotary and reciprocating needle cylinder, a set of long butt needles, a set of short butt needles, a set of long butt call jacks controlling the short butt needles, a set of short butt call jacks controlling the long butt needles, cams for the needles, cams for the call jacks, means for rendering the long butt call jacks inoperative and narrowing and widening mechanism operating upon the short butt call jacks, substantially as described.

5. In combination in a circular stocking knitting machine, a cylinder having rotary and reciprocating movement, long and short butt needles, two stitch cams therefor disposed at different points circumferentially of the cylinder, means for automatically adjusting the stitch cams radially out of line with the short butt needles when the machine goes on reciprocating knitting, and means for rendering the short butt needles inoperative, substantially as described.

6. In combination in a circular stocking knitting machine, a cylinder having rotary and reciprocating movement, long and short shank needles, two stitch cams, one of which operates the needles for rotary knitting and both operate on the long shank needles for reciprocating knitting, one on one stroke and the other on the other stroke of the cylinder, means for rendering the short shank needles inoperative, means for automatically adjusting the stitch cams radially from action upon the inoperative short shank needles and means for narrowing and widening on the long shank needles, substantially as described.

7. In combination in a circular stocking knitting machine, a cylinder having rotary and reciprocating movement, long and short butt needles, two stitch cams, one of which operates the needles for rotary knitting and both operate on the long butt needles for reciprocating knitting, one on one stroke and the other on the other stroke of the cylinder, means for rendering short butt needles inoperative, means for automatically adjusting the stitch cams radially from action upon the inoperative short butt needles, means for narrowing and widening on the long butt needles, and means for automatically adjusting the stitch cams vertically back and forth in and, in respect to each other, in opposite directions during reciprocating knitting, substantially as described.

8. In combination in a circular stocking knitting machine, a cylinder having rotary and reciprocating movement, needles, means for rendering a portion of the needles inoperative, stitch cams, means for adjusting the stitch cams from action upon the inoperative needles for reciprocating knitting, means for automatically adjusting the stitch cams back and forth and, in respect to each other, in opposite directions along the needles during reciprocating knitting and means for adjusting the stitch cams automatically and simultaneously and in the same direction for tight or loose knitting, substantially as described.

9. In combination in a circular stocking machine, a cylinder having rotary and reciprocating movement, needles, means for rendering a part of the needles inoperative, two stitch cams, one of which operates on the needles for rotary knitting and both operate on the operative needles in reciprocating work, one on one stroke of the cylinder and the other on the other stroke of the cylinder and means for automatically adjusting the stitch cams from action upon the inoperative set of needles and for adjusting said stitch cams back and forth and, in respect to each other, in opposite directions, substantially as described.

10. In combination in a circular stocking knitting machine, a cylinder having rotary and reciprocating movement, needles, means for rendering a portion of the needles inoperative, web holders, two stitch cams for one feed, two web holder advancing cams, and means for automatically adjusting the stitch cams from action upon needles which are to remain inoperative, and means for adjusting the web holder cams back and forth and, in respect to each other, in opposite directions during reciprocating knitting, substantially as described.

11. In combination in a circular knitting machine, a cylinder having rotary and reciprocating movement, long and short butt needles, long and short butt call jacks, cams for the needles, cams for the jacks, said long butt call jacks controlling the short butt needles and said short butt call jacks controlling the long butt needles, mechanism for adjusting the needle stitch cams automatically when the machine goes onto reciprocating knitting and mechanism for narrowing and widening on the short butt call jacks, substantially as described.

12. In combination in a circular stocking knitting machine, a cylinder having rotary and reciprocating movement, long and short butt needles, long and short butt call jacks, two stitch cams for one feed, cams for the jacks, said long butt call jacks controlling the short shank needles, and said short butt call jacks controlling the long butt needles, means for rendering the long butt call jacks inoperative, and means for adjusting the stitch cams from action upon the inoperative needles, means for adjusting the stitch cams vertically back and forth and in opposite directions when on reciprocating knitting, and mechanism for narrowing and widening on the short shank call jacks, substantially as described.

13. In combination in a circular stocking knitting machine, a cylinder having rotary and reciprocating movement, long and short butt needles, long and short butt call jacks operating respectively on the short and long butt needles, web holders, two stitch cams for the needles for one feed, two advancing cams for the web holders for one feed, means for automatically adjusting the stitch cams and the web holder advancing cams and narrowing and widening mechanism operating on the call jacks, substantially as described.

14. In combination in a circular stocking knitting machine, a cylinder having rotary and reciprocating movement, long and short butt needles, long and short butt call jacks operating respectively on the short and long butt needles, means for rendering the long butt call jacks inoperative, web holders, two stitch cams for the needles for one feed, two advancing cams for the web holders for one feed, means for adjusting the needle stitch cams radially to be out of line with the short butt needles, means for adjusting the stitch cams vertically back and forth and in opposite directions relative to each other, means for adjusting the web holder advancing cams back and forth in opposite directions relatively to each other, and means for narrowing and widening on the short butt call jacks, substantially as described.

15. In combination in a circular stocking knitting machine, a cylinder having rotary and reciprocating movement, needles, two stitch cams and an advancing cam for one feed, the latter cam having a needle path below it for inoperative needles, means for rendering a portion of the needles inoperative to pass below the advancing cam, automatic means for adjusting the two stitch cams out of line with the inoperative set of needles, and means for adjusting both stitch cams for tight or loose knitting, and narrowing and widening mechanism, substantially as described.

16. In combination in a circular stocking knitting machine, a cylinder having rotary and reciprocating movement, two sets of needles, means for rendering one set inoperative, two stitch cams for one feed, means for adjusting the two stitch cams out of line with the inoperative set of needles, means for automatically adjusting the stitch cams back and forth and, in respect to each other, in opposite directions during reciprocating knitting and means for adjusting the stitch cams for tighter or looser knitting, substantially as described.

17. In combination in a circular stocking knitting machine, a cylinder having rotary and reciprocating movement, two sets of needles, means for rendering one set inoperative, two stitch cams for one feed, means for adjusting the two stitch cams out of line with the inoperative set of needles, means for automatically adjusting the stitch cams back and forth and, in respect to each other, in opposite directions during reciprocating knitting and automatic and hand operated means for adjusting the stitch cams simultaneously for tighter or looser knitting, substantially as described.

18. In combination in a circular stocking machine, a cylinder having rotary and reciprocating movement, needles, means for rendering a portion of the needles inoperative, two stitch cams for one feed, means for adjusting the needle cams out of line with the inoperative set of needles, web holders coöperating with the needles, two advancing cams for said web holders for one feed, automatic means for adjusting the stitch cams and the advancing cams of the web holders for tight or loose knitting substantially in unison and narrowing and widening mechanism operating in connection with the needles, substantially as described.

19. In combination in a circular stocking knitting machine, a cylinder having rotary and reciprocating movement, needles, means for rendering a part of the needles inoperative, two stitch cams for one feed, means for adjusting the stitch cams from action upon the inoperative needles, web holders coöperating with the needles, two advancing cams therefor for one feed, automatic means for adjusting the stitch cams back and forth and in opposite directions, and for adjusting the advancing cams of the web holders back and forth and, in respect to each other, in opposite directions during reciprocating knitting, and automatic means for adjusting the stitch cams and the web holder advancing cams in unison for tight or loose knitting and narrowing and widening mechanism, substantially as described.

20. In combination in a circular stocking knitting machine, a cylinder having rotary and reciprocating movement, knitting elements, two cams therefor, for performing, alternately, like functions thereon during reciprocating knitting, each of said cams being automatically adjustable for tight or loose knitting and automatically adjustable back and forth and in a direction opposite to that of the other cam during reciprocating knitting, and narrowing and widening mechanism, substantially as described.

21. In combination in a circular stocking knitting machine, a cylinder having rotary and reciprocating movement, needles, needle cams, web holders, two web holder advancing cams for one feed located at fixed points about the machine, means for changing the cylinder from rotary to reciprocating movement and means for automatically adjusting the web holder advancing cams in unison for reciprocating work, substantially as described.

22. In combination in a circular stocking knitting machine, a cylinder having rotary and reciprocating movement, needles, needle cams, web holders, two web holders advancing cams for one feed, means for changing the cylinder from rotary to reciprocating movement and means for automatically adjusting the web holder advancing cams back and forth and, in respect to each other, in opposite directions during reciprocating knitting, substantially as described.

23. In combination in a circular stocking knitting machine, a cylinder having rotary and reciprocating movement, needles, needle cams, web holders, two web holder advancing cams for one feed, means for changing the cylinder from rotary to reciprocating movement, means for adjusting the web holder advancing cams in unison and automatic means for adjusting said web holder cams back and forth and, in respect to each other, in opposite directions during reciprocating knitting, substantially as described.

24. In combination in a circular stocking knitting machine, a cylinder having rotary and reciprocating movement, needles, two stitch cams for one feed, web holders, two web holder advancing cams for one feed, and means for adjusting the stitch cams back and forth and, in respect to each other, in opposite directions and for simultaneously adjusting the advancing cams of the web holders back and forth and, in respect to each other, in opposite directions during reciprocating knitting, substantially as described.

25. In combination in a circular stocking knitting machine, a cylinder having rotary and reciprocating movement, needles, two stitch cams for one feed, web holders, two web holder advancing cams for one feed, and means for adjusting the stitch cams vertically back and forth and in opposite directions in respect to each other, and for simultaneously adjusting the advancing cams of the web holders back and forth and, in respect to each other, in opposite directions during reciprocating knitting, and means for adjusting both stitch cams and both advancing cams in unison for tighter and looser knitting, substantially as described.

26. In combination in a circular stocking machine, a cylinder having rotary and reciprocating movement, two sets of needles, two stitch cams for one feed, a circumferentially moving cam for retracting the stitch cams radially to be out of line with one set of needles, and means for automatically shifting the stitch cams vertically back and forth and in opposite directions in respect to each other, substantially as described.

27. In combination in a circular stocking machine, a cylinder having rotary and reciprocating movement, two sets of needles having respectively long and short shanks, two stitch cams for one feed, blocks carrying said stitch cams, means for shifting the blocks radially to carry the stitch cams away from the short shank needles, levers mounted on the blocks and connected with the stitch cams, and means for moving said levers automatically and respectively in opposite directions, to adjust the stitch cams in opposite directions in respect to each other, substantially as described.

28. In combination in a circular stocking machine, a cylinder having rotary and reciprocating movement, long and short shank needles, two stitch cams for one feed, means for rendering the short shank needles inoperative, narrowing and widening mechanism operating on the long shank needles, means for withdrawing the stitch cams out of the path of the short shank needles, knitting elements coöperating with the needles, cams for said knitting elements, vertical rods with connections to the stitch cams and the cams of the knitting elements, means for moving said rods in unison in one direction and for moving them back and forth vertically and, in respect to each other, in opposite directions, substantially as described.

29. In combination in a circular knitting machine, a cylinder having rotary and reciprocating movement, needles, web holders, two stitch cams for the needles at one feed and two advancing cams for the web holders at said feed, levers connected with the needle cams and movable vertically to adjust them, levers connected with the web holder cams and movable horizontally to adjust them and vertically extending rods with means for operating them in the same direction vertically for tight or loose knitting and in opposite directions vertically in respect to each other for preventing certain of the cams from acting on the needles and web holders on the reciprocating strokes, substantially as described.

30. In combination in a circular stocking machine, a cylinder having rotary and reciprocating movement, knitting elements, two cams therefor, at one feed for performing alternately, like functions thereon, a connection to both cams for adjusting them in the same direction automatically for tight or loose knitting, with means for adjusting the said cams back and forth and in respect to each other in opposite directions, said means being interposed in and forming a part of the said automatic adjusting connection, substantially as described.

31. In combination in a circular stocking machine, a cylinder having rotary and reciprocating movement, knitting elements, two cams therefor, for performing, at one feed, alternately, like functions thereon, a connection to both sets of cams for adjusting them in the same direction for tight or loose knitting, with means for adjusting the said cams back and forth and, in respect to each other, in opposite directions, said means being interposed in and forming a part of the said adjusting connection, said connection comprising a pair of reciprocating rods and said means including a reciprocating cam slide for operating the rods, substantially as described.

32. In a circular knitting machine, a rotary needle cylinder, driving connections for moving the cylinder for round and round and for reciprocating work, independently operated spring needles and cams for operating them individually, pressing means for the needle beards, sinkers for sinking the yarn to the spring needles, approximately one half of the needles being made inoperative in a plane below the sinkers when the cylinder is reciprocated, mechanism for so rendering the said needles inoperative and narrowing and widening mechanism, substantially as described.

33. In a circular knitting machine, a needle cylinder, connections for driving the cylinder round and round or for reciprocating it, spring needles, some having long and others short butts, pressing means for the needle beards, sinkers for sinking the yarn to the needles, and mechanism for rendering the short butt needles inoperative in a plane below the sinkers when the cylinder is reciprocated, and narrowing and widening mechanism operating upon the long butt needles, substantially as described.

34. In combination in a spring needle knitting machine, spring needles, sinkers, pressing means, a needle cylinder, driving connections for moving the cylinder round and round or for reciprocating it, long and short butt needles, long butt call jacks operating upon the short butt needles, short butt call jacks operating upon the long butt needles, cams for the needles, cams for the call jacks, mechanism for rendering the long butt call jacks together with their companion short butt needles inoperative when the short butt needles are in a plane below the sinkers for heel and toe work, and mechanism for narrowing or widening on the short butt call jacks, substantially as described.

35. In combination in a spring needle knitting machine, long and short butt spring needles, pressing means therefor, sinkers, cams therefor, a rotary and reciprocating cylinder, driving mechanism for changing the cylinder from rotary to reciprocating movement, two stitch cams for one feed, two cams for the sinkers for one feed, means for shifting the stitch cams radially out of the path of the short butt needles when the latter are in a plane below the sinkers, long and short butt call jacks operating respectively upon the short and long butt needles, means for rendering the long butt call jacks inoperative and narrowing and widening mechanism operating upon the short butt call jacks, substantially as described.

36. In combination in a spring needle knitting machine, long and short butt spring needles, pressing means therefor, sinkers, cams therefor, a rotary and reciprocating cylinder, driving mechanism for changing the cylinder from rotary to reciprocating movement, two stitch cams for one feed, two advancing cams for the sinkers for one feed, means for shifting the stitch cams radially out of the path of the short butt needles when the latter are in a plane below the sinkers, long and short butt call jacks operating respectively upon the short and long butt needles, means for rendering the long butt call jacks inoperative and narrowing and widening mechanism operating upon the short butt call jacks, and means for adjusting the stitch cams and sinker cams for tighter or looser knitting, substantially as described.

37. In combination in a spring needle knitting machine, long and short butt spring needles, pressing means therefor, sinkers, cams therefor, a rotary and reciprocating cylinder, driving mechanism for changing the cylinder from rotary to reciprocating movement, two stitch cams for one feed, two sinker advancing cams for one feed, means for shifting the stitch cams radially out of the path of the short butt needles when the latter are in a plane below the sinkers, long and short butt call jacks operating respectively upon the short and long butt needles, means for rendering the long butt call jacks inoperative, narrowing and widening mechanism operating upon the short butt call jacks, and automatic means for adjusting the stitch cams back and forth vertically along the needles and in respect to each other, in opposite directions, substantially as described.

38. In combination in a circular spring needle knitting machine, a cylinder having rotary and reciprocating movement, pressing means, sinkers, two stitch cams for the needles for one feed, long and short butt spring needles, mechanism for rendering the short butt needles inoperative in a low plane below the sinkers, means for securing a relative adjustment between the inoperative short butt needles and the stitch cams to prevent the said cams from acting thereon and mechanism for narrowing and widening on the long butt needles, substantially as described.

39. In combination in a circular stocking spring needle knitting machine, a needle cylinder, driving means for giving the cylinder rotary and reciprocating movements, long and short butt spring needles, pressing means, sinkers, mechanism for rendering the spring needles inoperative in a low plane below the sinkers, stitch cams operating on both the long and short butt spring needles during rotary work, mechanism for adjusting the stitch cams radially away from the short butt needles but not out of the path of the long butt needles during reciprocating work, said mechanism effecting said adjustment automatically when the machine changes from rotary to reciprocating knitting, and mechanism for narrowing and widening on the short shank needles, substantially as described.

40. In combination in a spring needle knitting machine, a cylinder having rotary and reciprocating movement, sinkers, two sets of needles, having respectively long and short butts, pressing means, mechanism for rendering one set of needles inoperative in a low plane below the sinkers, stitch cams for knitting on the other set of needles during reciprocation of the cylinder for heel and toe work, and mechanism for automatically and alternately adjusting the said stitch cams vertically to prevent, on the return stroke, depressing those needles on which stitches have been formed, substantially as described.

41. In combination in a spring needle knitting machine, a cylinder having rotary and reciprocating movement, sinkers, two sets of needles, having respectively long and short butts, pressing means, mechanism for rendering one set of needles inoperative in a low plane below the sinkers, stitch cams for knitting on the other set of needles during reciprocation of the cylinder for heel and toe work, and mechanism for automatically and alternately adjusting the said stitch cams vertically to prevent, on the return stroke, depressing those needles on which stitches have been formed, and mechanism for adjusting the stitch cams radially out of the path of the short butt needles, substantially as described.

42. In combination in a spring needle knitting machine, a rotary and reciprocating cylinder, two sets of needles having respectively long and short butts, pressing means, sinkers, stitch cams, mechanism making the short butt needles inoperative in a low plane below the sinkers, mechanism for adjusting the stitch cams radially, mechanism for adjusting the stitch cams vertically in unison and in one direction, and mechanism for adjusting the stitch cams vertically and in opposite directions in respect to each other, substantially as described.

43. In combination in a spring needle knitting machine, a rotary and reciprocating cylinder, sinkers, two sets of needles having respectively long and short butts, pressing means, two sets of call jacks having respectively long and short butts, the long butt call jacks operating upon the short butt needles and the short butt call jacks operating upon the long butt needles, cams for operating the call jacks, stitch cams for operating the needles, mechanism for changing the motion of the machine from rotary to reciprocating movement, means for withdrawing the stitch cams from the path of the short butt needles, means for adjusting the stitch cams for tight or loose fabric, means for adjusting the stitch cams vertically in opposite directions in respect to each other, and means for narrowing or widening on the short butt call jacks, substantially as described.

44. In combination in a spring needle knitting machine, a cylinder having rotary and reciprocating movement, spring needles, pressing means, sinkers, two sinker advancing cams, means for changing the cylinder from rotary to reciprocating work and means for adjusting the sinker advancing cams back and forth and in respect to each other, in opposite directions automatically during reciprocating knitting, substantially as described.

45. In combination in a spring needle knitting machine, a cylinder having rotary and reciprocating movement, spring needles, pressing means, sinkers, means for rendering a part of the needles inoperative in a plane below the sinkers, means for changing the cylinder from rotary to reciprocating knitting, two sinker advancing cams, and means for adjusting the sinker cams back and forth and in respect to each other in opposite directions automatically during reciprocating work, substantially as described.

46. In combination in a circular spring needle knitting machine, a cylinder having rotary and reciprocating movement, means for automatically changing the movement, spring needles, two stitch cams for one feed, pressing means, sinkers, two sinker advancing cams for one feed and means for adjusting automatically both sinker cams and both stitch cams for tighter or looser knitting, substantially as described.

47. In combination in a circular knitting machine, a cylinder having rotary and reciprocating movement, means for automatically changing the movement, spring needles, two stitch cams for one feed, pressing means, sinkers, two sinker advancing cams for one feed, and means for automatically adjusting each stitch cam and each sinker cam back and forth and in opposite directions in respect to the other stitch cam and sinker cam, and means for adjusting both stitch cams and both sinker cams automatically for tight or loose knitting, substantially as described.

48. In combination in a circular spring needle knitting machine, a cylinder having rotary and reciprocating movement with means for automatically changing from one movement to the other, spring needles, sinkers, cams for the needles, cams for the sinkers, web holders, cams for the web holders, and two pressing devices for one feed disposed at different points about the needle circle, one of said presser devices being effective on circular work and both of said pressing devices acting on the needles during reciprocating work, said pressers being interposed between the sinkers and the web holders, substantially as described.

49. In combination in a spring needle knitting machine, a cylinder having rotary and reciprocating movement, means for automatically changing from one movement to the other, spring needles, two stitch cams for one feed, sinkers, two advancing cams for one feed for operating the sinkers, web holders, cams for the web holders, and two needle pressing devices disposed at different points about the needle circle, one presser and one of said stitch cams and one of said sinker advancing cams being effective when knitting circular work, and both of said stitch cams, sinker advancing cams and pressing devices being effective during reciprocating work, said pressers being interposed between the sinkers and web holders, substantially as described.

50. In combination in a spring needle knitting machine, a cylinder having rotary and reciprocating movement, means for automatically changing from one movement to the other, spring needles, two stitch cams for one feed, sinkers, two advancing cams for operating the sinkers, one of said stitch cams and one of said sinker advancing cams being effective in circular work and both of said stitch cams and sinker advancing cams being effective during reciprocating work, web holders, web holder cams, and two needle pressing devices disposed at different points about the needle circle, one presser being effective when knitting in one direction and the other when knitting in the reverse direction, and one of said pressing devices including a tuck presser wheel, said pressers being interposed between the sinkers and the web holders, substantially as described.

51. In combination in a spring needle knitting machine, a cylinder having rotary and reciprocating movement, means for automatically changing from one movement to the other, spring needles, pressing means, web holders, sinkers, means for rendering a portion of the needles inoperative in a plane below the sinkers, two stitch cams, two web holder advancing cams, two sinker advancing cams for one feed, means for adjusting the stitch cams out of line with the inoperative needles, and means for automatically operating stitch cams of the needles and the advancing cams of the web holder and sinkers back and forth and in opposite directions during reciprocating knitting, substantially as described.

52. In combination in a circular knitting machine, a cylinder, needles, knitting elements coöperating with the needles, cams for the needles, cams for the knitting elements, a vertically movable lever for adjusting one of the needle cams, a horizontally movable lever for adjusting the cam of the coöperating knitting elements, and a vertically movable rod having means for operating both of said levers, substantially as described.

53. In combination in a circular knitting machine, a cylinder having rotary and reciprocating movements, needles in two sets, one having short butts and the other long butts, a cam operating upon both sets of needles during rotary work and automatically adjustable radially to avoid the short butt needles and operate only the long butt needles on reciprocating work, and means for rendering the short butt needles inoperative when the machine goes on reciprocating knitting, substantially as described.

54. In combination in a circular knitting machine, a cylinder having rotary and reciprocating movement, needles in two sets, one having short butts, and the other long butts, and a cam operating upon both sets of needles during rotary work and automatically adjustable radially to avoid the short butt needles and operate only the long butt needles on reciprocating work, and automatically operating means for adjusting said cam vertically, and means for rendering the short butt needles inoperative when the machine goes on reciprocating knitting, substantially as described.

55. In combination in a knitting machine, needles, jacks having each a lower shank to be engaged by its operating cam and an upper nib to be engaged by a guard cam, and an upper head on its opposite side from the upper nib to engage the needles and an overthrow guard cam to engage the underside of the upper nib, substantially as described.

56. In combination in a knitting machine, needles, jacks connected therewith having upper nibs and lower butts, a draw cam to engage the lower butts and draw the jack downwardly, and an overthrow guard cam to engage the underside of the upper nib, substantially as described.

57. In combination in a knitting machine, needles, jacks connected therewith having an upper nib and a lower butt, a draw cam to engage the lower shank and draw the jack downwardly, and a guard cam to engage the under side of the upper nib, said draw cam and guard cam being connected for simultaneous adjustment, substantially as described.

58. In combination in a stocking machine, a rotary and a reciprocating cylinder, two needle cams, a sliding member for each cam to which said cams are attached, said members being slidable along the needle stems, and overthrow guard members adjustably connected each to one of the sliding members, the said stitch cams with their sliding members and guard members having automatic sliding movement longitudinally of the needle stems for making loose and tight knitting, and having sliding movement for narrowing and widening on reciprocating knitting, and means for sliding the said members and for adjusting them with their cams and guard members, substantially as described.

59. In combination with sliding needle jacks having butts, a draw cam for operating the jacks, said jacks having a nib projecting outwardly and a guard cam operating on the nib to prevent overthrow.

60. In combination in a knitting machine, needles, needle cams, needle jacks engaged by the said cams and having upper nibs extending outwardly, and a guard for the needles engaging the nibs of the jacks, said guard being adjustable, substantially as described.

61. In combination in a knitting machine, a cylinder, needles, a needle cam adjustable toward and from the needles, a fixed facing cam in front of said adjustable cam and a cam box supporting the fixed cam rigidly in relation to the cylinder, substantially as described.

62. In combination in a knitting machine, needles, stitch cams movable toward and from the needle cylinder and a fixed facing cam between the stitch cam and the needle cylinder, long and short shank needles, and an advancing cam for the needles, the said facing cam serving to retain the short shank needles low enough to pass below the advancing cam but not drawing the needles as low as the stitch cam, substantially as described.

63. In combination in a knitting machine, needles, a cylinder, a stitch cam adjustably mounted and a facing cam in front of the stitch cam rigidly mounted and having its incline pitched lower than that of the stitch cam, substantially as described.

64. In combination in a knitting machine a cylinder, needles, a needle cam adjustable radially and vertically, a fixed facing cam in front of the needle cam and a cam box supporting said cams, substantially as described.

65. In combination in a knitting machine a cylinder, needles, a needle cam adjustably mounted to move radially, a rigid facing cam overlying the adjustable cam, said facing cam having a recess at its lower edge and said adjustable cam having a projecting lip, substantially as described.

66. In combination in a knitting machine, needles, a set of elements common to machines of different diameters and gages comprising needle cams, a lower cylinder common to a plurality of diameters and gages of upper cylinders, said lower cylinder being externally grooved, interchangeable needle operating jacks in the grooves of said lower cylinder, an upper needle cylinder of smaller diameter than the common lower cylinder detachably mounted on the lower common cylinder and interchangeable with an upper cylinder or cylinders of different diameters, and spacing means interposed between the upper and lower cylinders and interchangeable with other spacing means to combine said upper cylinders of different diameters with said lower common cylinder, substantially as described.

67. In combination in a circular knitting machine, spring needles, a needle evener on the inside of the needle row and a vertically movable support for the said evener to permit it to be shifted outside the needle row, said evener being turnable in a horizontal plane to clear the sinkers to permit its vertical movement, substantially as described.

68. In combination in a circular knitting machine, a cylinder, needles, a needle evener inside of a needle row, a frame member, a shifting support for said evener, whereby it may be removed from within the needle row, said needle evener being pivotally mounted on its support to turn in a horizontal plane and having a portion to engage the frame member to lock itself together with its support in place, substantially as described.

69. In combination in a circular knitting machine, a cylinder, needles, sinkers and web holders outside the needle row, all individually operated, cams for the needles, sinkers and web holders, and connections outside the needle row for simultaneously adjusting the cams for the needles, web holders and sinkers for varying the texture of the fabric, substantially as described.

70. In combination in a circular knitting machine having reciprocatory movement for knitting heels and toe pockets, a cylinder, needles, sinkers and web holders all individually operated, cams for the needles and cams for the sinkers and web holders, connections for the simultaneous automatic adjustment of the cams of the needles and sinkers and web holders in changing from circular knitting to reciprocating knitting and from reciprocating knitting back to circular knitting again, and means for adjusting all said connections automatically for varying the texture of the fabric, substantially as described.

71. In combination in a circular spring needle knitting machine, a cylinder having rotary and reciprocating movement, two sets of needles, means for rendering one set inoperative, two stitch cams for one feed, web holders, two advancing web holder cams for one feed, sinkers, two sinker advancing cams for one feed, means for adjusting in unison the cams for tighter or looser knitting and means for adjusting the stitch cams automatically and, in respect to each other, in opposite directions during reciprocating work, and means for adjusting in like manner the web holder advancing cams and the sinker advancing cams, substantially as described.

72. In combination in a circular knitting machine, a needle cylinder having rotary and reciprocating movements, two stitch cams, a pair of vertically movable members connected to the stitch cams for moving them vertically and means for adjusting said members automatically and vertically for tight or loose knitting and for automatically operating them in opposite directions during reciprocating knitting, substantially as described.

73. In combination in a circular knitting machine, a needle cylinder having rotary and reciprocating movements, two stitch cams, a pair of vertically movable members connected to the stitch cams for moving them vertically, and means for adjusting said members automatically and vertically for tight or loose knitting and for automatically operating them in opposite directions during reciprocating knitting, said means including a cam slide engaging said members, means for reciprocating the cam slide, and means for moving the cam slide vertically, substantially as described.

In testimony whereof, I affix my signature in presence of two witnesses.

FRANK WILCOMB.

Witnesses:
JAMES L. DEGNAN,
CHARLES M. READ.